(12) United States Patent
Tzikas et al.

(10) Patent No.: US 7,038,024 B2
(45) Date of Patent: May 2, 2006

(54) FIBRE-REACTIVE AZO DYES, THEIR PREPARATION AND THEIR USE

(75) Inventors: Athanassios Tzikas, Pratteln (CH); Bernhard Müller, Efringen-Kirchen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 116 days.

(21) Appl. No.: 10/492,181

(22) PCT Filed: Oct. 4, 2002

(86) PCT No.: PCT/EP02/11166

§ 371 (c)(1), (2), (4) Date: Apr. 9, 2004

(87) PCT Pub. No.: WO03/033599

PCT Pub. Date: Apr. 24, 2003

(65) Prior Publication Data

US 2004/0255404 A1    Dec. 23, 2004

(30) Foreign Application Priority Data

Oct. 12, 2001 (EP) .................................. 01810994

(51) Int. Cl.
*C09B 62/507* (2006.01)
*D06P 1/38* (2006.01)

(52) U.S. Cl. .................... 534/637; 534/638; 534/642; 8/549

(58) Field of Classification Search ................ 534/637, 534/638, 642; 8/549
See application file for complete search history.

(56) References Cited

U.S. PATENT DOCUMENTS

| 2,432,403 | A | * | 12/1947 | Friedrich et al. ............ 534/676 |
| 4,897,469 | A | | 1/1990 | Eilingsfeld et al. ......... 534/605 |
| 5,424,405 | A | | 6/1995 | Adam et al. ................ 534/642 |
| 5,817,779 | A | | 10/1998 | Deitz et al. ................. 534/637 |
| 6,160,101 | A | | 12/2000 | Tzikas et al. ............... 534/634 |

FOREIGN PATENT DOCUMENTS

| EP | 0197418 | 10/1986 |
| EP | 0286021 | 10/1988 |
| EP | 0785237 | 7/1997 |
| EP | 1035171 | 9/2000 |
| GB | 1349168 | 3/1974 |
| KR | 904223 | 6/1990 |
| WO | 97/43345 | 11/1997 |

OTHER PUBLICATIONS

Derwent Abstr. 86-273362/42 for EP 197418 (1986).

* cited by examiner

Primary Examiner—Fiona T. Powers
(74) Attorney, Agent, or Firm—Kevin T. Mansfield

(57) ABSTRACT

Reactive dyes containing at least one structural unit of formula (I), wherein Y is vinyl or a radical —CH$_2$—CH$_2$—U and U is a group removable under alkaline conditions, are suitable for dyeing cellulosic or amide-group-containing fiber materials.

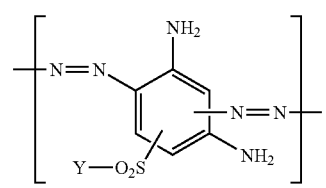

(I)

13 Claims, No Drawings

FIBRE-REACTIVE AZO DYES, THEIR PREPARATION AND THEIR USE

The present invention relates to fibre-reactive dyes, to processes for the preparation thereof and to the use thereof in dyeing or printing textile fibre materials.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye binding stability; it should also be possible for dye that is not fixed to the fibre to be washed off easily. The dyes should also yield dyeings having good all-round fastness properties, for example light-fastness and wet-fastness properties.

It has been shown that the problem posed is largely solved by the novel dyes defined below.

The present invention accordingly relates to reactive dyes of formula (1)

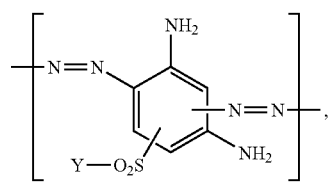

preferably of formula (1a)

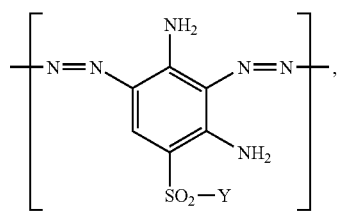

wherein

Y is vinyl or a radical —$CH_2$—$CH_2$—U and U is a group removable under alkaline conditions.

The azo dyes according to the invention preferably correspond to formula (1aa) or (1ab)

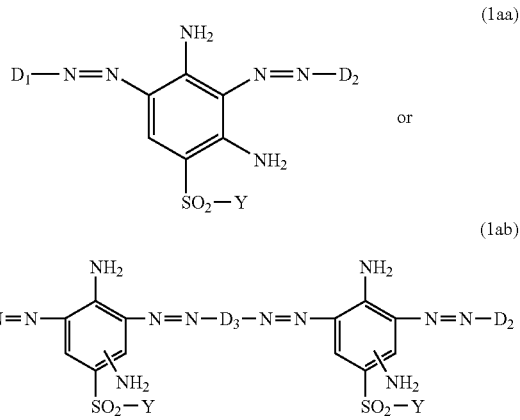

wherein $D_1$ and $D_2$ are each independently of the other the radical of a diazo component, of the benzene or naphthalene series, $D_3$ is the radical of an aromatic tetraazo component, and Y is as defined above.

Suitable substituents of the radicals $D_1$ and $D_2$ include the substituents customary for azo dyes. The following may be mentioned by way of example: $C_1$–$C_4$alkyl, which is to be understood as being methyl, ethyl, n- or iso-propyl, and n-, iso-, sec- or tert-butyl; $C_1$–$C_4$-alkoxy, which is to be understood as being methoxy, ethoxy, n- or iso-propoxy and n-, iso-, sec- or tert-butoxy; hydroxy-$C_1$–$C_4$alkoxy; phenoxy; $C_2$–$C_6$alkanoylamino unsubstituted or substituted in the alkyl moiety by hydroxy or by $C_1$–$C_4$alkoxy, e.g. acetylamino, hydroxyacetylamino, methoxyacetylamino or propionylamino; benzoylamino unsubstituted or substituted in the phenyl moiety by hydroxy, sulfo, halogen, $C_1$–$C_4$alkyl or by $C_1$–$C_4$alkoxy; $C_1$–$C_6$alkoxycarbonylamino unsubstituted or substituted in the alkyl moiety by hydroxy, $C_1$–$C_4$alkyl or by $C_1$–$C_4$alkoxy; phenoxycarbonylamino unsubstituted or substituted in the phenyl moiety by hydroxy, $C_1$–$C_4$alkyl or by $C_1$–$C_4$alkoxy; amino; N—$C_1$–$C_4$alkyl- or N,N-di-$C_1$–$C_4$alkyl-amino unsubstituted or substituted in the alkyl moiety by hydroxy, $C_1$–$C_4$alkoxy, carboxy, cyano, halogen, sulfo, sulfato, phenyl or by sulfophenyl, e.g. methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)-amino, N-(β-sulfoethyl)-N-benzylamino; cyclohexylamino; N-phenylamino or N—$C_1$–$C_4$alkyl-N-phenylamino unsubstituted or substituted in the phenyl moiety by nitro, $C_1$–$C_4$alkyl, $C_1$–$C_4$alkoxy, carboxy, halogen or by sulfo; $C_1$–$C_4$alkoxycarbonyl, e.g. methoxy- or ethoxy-carbonyl; trifluoromethyl; nitro; cyano; halogen, which is to be understood generally as being, for example, fluorine, bromine or, especially, chlorine; ureido; hydroxy; carboxy; sulfo; sulfomethyl; carbamoyl; carbamido; sulfamoyl; N-phenylsulfamoyl or N—$C_1$–$C_4$alkyl-N-phenylsulfamoyl unsubstituted or substituted in the phenyl moiety by sulfo or by carboxy; methyl- or ethyl-sulfonyl.

Suitable substituents of the radicals $D_1$ and $D_2$ also include fibre-reactive radicals.

Fibre-reactive radicals are to be understood as being those which are capable of reacting with the hydroxy groups of cellulose, with the amino, carboxy, hydroxy and thiol groups in wool and silk or with the amino and possibly carboxy groups of synthetic polyamides to form covalent chemical bonds. The fibre-reactive radicals are generally bonded to the dye radical directly or via a bridging member. Suitable fibre-reactive radicals are, for example, those having at least one removable substituent at an aliphatic, aromatic or heterocyclic radical or those wherein the mentioned radicals contain a radical suitable for reaction with the fibre material, for example a vinyl radical.

A fibre-reactive radical present in $D_1$ and $D_2$ corresponds, for example, to formula (2a), (2b), (2c), (2d), (2e), (2f) or (2g)

—SO$_2$—Y,  (2a)

—NH—CO—(CH$_2$)$_l$—SO$_2$—Y,  (2b)

—CONR$_2$—(CH$_2$)$_m$—SO$_2$—Y,  (2c)

—NH—CO—CH(Hal)—CH$_2$—Hal,  (2d)

—NH—CO—C(Hal)═CH$_2$,  (2e)

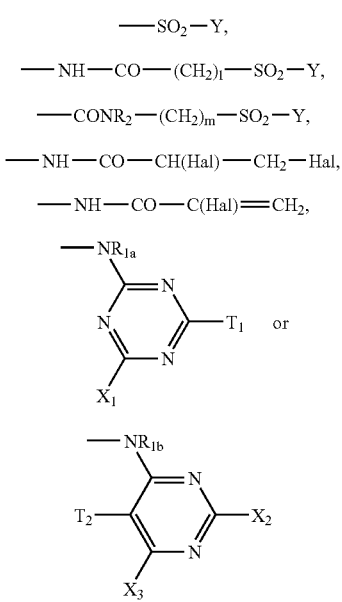
(2f)

(2g)

wherein

Hal is chlorine or bromine, $X_1$ is halogen, 3-carboxypyridin-1-yl or 3-carbamoylpyridin-1-yl, $T_1$ has independently the same definitions as $X_1$, or is a non-fibre-reactive substituent or a fibre-reactive radical of formula (3a), (3b), (3c), (3d), (3e) or (3f)

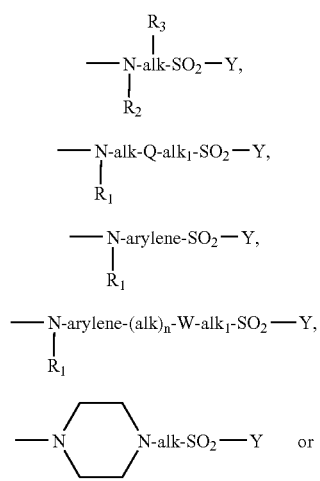

(3a)

(3b)

(3c)

(3d)

(3e)

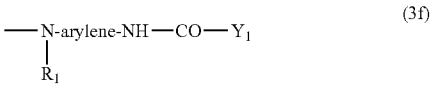
(3f)

wherein $R_1$, $R_{1a}$ and $R_{1b}$ are each independently of the others hydrogen or $C_1$–$C_4$alkyl, $R_2$ is hydrogen, $C_1$–$C_4$alkyl unsubstituted or substituted by hydroxy, sulfo, sulfato, carboxy or by cyano, or a radical

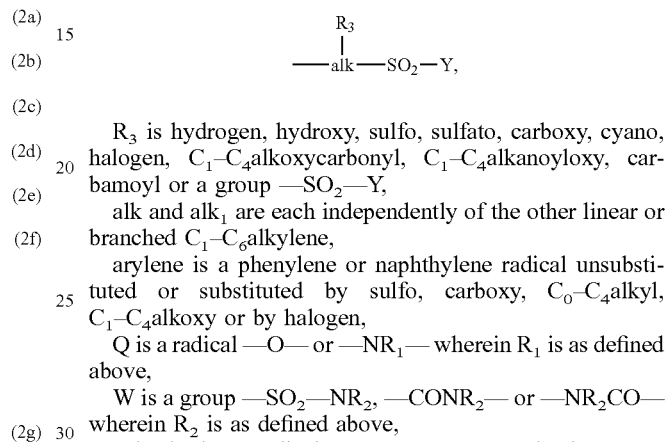

$R_3$ is hydrogen, hydroxy, sulfo, sulfato, carboxy, cyano, halogen, $C_1$–$C_4$alkoxycarbonyl, $C_1$–$C_4$alkanoyloxy, carbamoyl or a group —SO$_2$—Y, alk and alk$_1$ are each independently of the other linear or branched $C_1$–$C_6$alkylene, arylene is a phenylene or naphthylene radical unsubstituted or substituted by sulfo, carboxy, $C_0$–$C_4$alkyl, $C_1$–$C_4$alkoxy or by halogen, Q is a radical —O— or —NR$_1$— wherein $R_1$ is as defined above, W is a group —SO$_2$—NR$_2$, —CONR$_2$— or —NR$_2$CO— wherein $R_2$ is as defined above, Y is vinyl or a radical —CH$_2$—CH$_2$—U and U is a group removable under alkaline conditions, $Y_1$ is a group —CH(Hal)—CH$_2$—Hal or —C(Hal)═CH$_2$ and Hal is chlorine or bromine, and l and m are each independently of the other an integer from 1 to 6 and n is a number 0 or 1, and $X_2$ is halogen or $C_1$–$C_4$alkylsulfonyl, $X_3$ is halogen or $C_1$–$C_4$alkyl, and $T_2$ is hydrogen, cyano or halogen.

As a group U removable under alkaline conditions there come into consideration, for example, —Cl, —Br, —F, —SO$_3$H, —OSO$_3$H, —OCO—CH$_3$, —OPO$_3$H$_2$, —OCO—C$_6$H$_5$, —OSO$_2$—C$_1$–$C_4$akyl and —OSO$_2$—N($C_1$–$C_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H and more especially —OSO$_3$H.

Examples of suitable radicals Y are accordingly vinyl, β-bromo- or β-chloro-ethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl, and especially vinyl or β-sulfatoethyl.

$R_1$, $R_{1a}$ and $R_{1b}$ preferably are each independently of the others hydrogen, methyl or ethyl, and especially hydrogen.

$R_2$ is preferably hydrogen or $C_1$–$C_4$alkyl, for example methyl, ethyl, propyl, isopropyl, butyl, isobutyl, sec-butyl and tert-butyl, and especially hydrogen, methyl or ethyl. $R_2$ is more especially hydrogen.

$R_3$ is preferably hydrogen.

l and m preferably are each independently of the other a number 2, 3 or 4, and especially a number 2 or 3.

More especially, l is the number 3 and m is the number 2.

For a non-fibre-reactive substituent $T_1$ there come into consideration, for example, the following radicals:

hydroxy;

$C_1$–$C_4$alkoxy, for example methoxy, ethoxy, n- or isopropoxy, n-, sec-, iso- or tert-butoxy, especially methoxy or ethoxy; the mentioned radicals are unsubstituted or substituted in the alkyl moiety, for example by $C_1$–$C_4$alkoxy, hydroxy, sulfo or by carboxy;

$C_1$–$C_4$alkylthio, for example methylthio, ethylthio, n- or iso-propylthio or n-butylthio; the mentioned radicals are unsubstituted or substituted in the alkyl moiety, e.g. by $C_1$–$C_4$alkoxy, hydroxy, sulfo or by carboxy;

amino;

N-mono- or N,N-di-$C_1$–$C_6$alkylamino, preferably N-mono- or N,N-di-$C_1$–$C_4$alkylamino; the mentioned radicals are unsubstituted or substituted in the alkyl moiety, e.g. by $C_2$–$C_4$-alkanoylamino, $C_1$–$C_4$alkoxy, hydroxy, sulfo, sulfato, carboxy, cyano, carbamoyl or by sulfamoyl and uninterrupted or interrupted in the alkyl moiety by oxygen; examples that may be mentioned include N-methylamino, N-ethylamino, N-propylamino, N,N-dimethylamino and N,N-diethylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-β-sulfatoethylamino, N-βsulfoethylamino, N-carboxymethylamino, N-β-carboxy-ethylamino, N-α,β-dicarboxy-ethylamino, N-α,γ-dicarboxypropylamino and N-ethyl-N-β-hydroxyethylamino or N-methyl-N-β-hydroxyethylamino;

$C_5$–$C_7$cycloalkylamino, for example cyclohexylamino, which includes both the unsubstituted radicals and the radicals substituted in the cycloalkyl ring, e.g. by $C_1$–$C_4$alkyl, especially methyl, or by carboxyl;

phenylamino or N—$C_1$–$C_4$alkyl-N-phenylamino, which includes both the unsubstituted radicals and the radicals substituted in the phenyl ring, e.g. by $C_1$–$C_4$alkyl, $C_1$–$C_4$alkoxy, $C_2$–$C_4$-alkanoylamino, carboxy, carbamoyl, sulfo or by halogen, for example 2-, 3- or 4-chlorophenylamino, 2-, 3- or 4-methylphenylamino, 2-, 3- or 4-methoxyphenylamino, 2-, 3- or 4-sulfophenylamino, disulfophenylamino or 2-, 3- or 4-carboxyphenyl-amino;

naphthylamino unsubstituted or substituted in the naphthyl ring, e.g. by sulfo, preferably the radicals substituted by from 1 to 3 sulfo groups, for example 1- or 2-naphthylamino, 1-sulfo-2-naphthylamino, 1,5-disulfo-2-naphthylamino or 4,8-disulfo-2-naphthylamino; or benzylamino unsubstituted or substituted in the phenyl moiety, e.g. by $C_1$–$C_4$alkyl, $C_1$–$C_4$-alkoxy, carboxy, sulfo or by halogen.

As a non-fibre-reactive radical, $T_1$ is preferably $C_1$–$C_4$alkoxy, $C_1$–$C_4$alkylthio, hydroxy, amino, N-mono- or N,N-di-$C_1$–$C_4$alkylamino unsubstituted or substituted in the alkyl moiety by hydroxy, sulfato or by sulfo, morpholino, or phenylamino or N-$C_1$–$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy, or naphthylamino unsubstituted or substituted by from 1 to 3 sulfo groups.

Especially preferred non-fibre-reactive radicals $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$–$C_4$alkyl-N-phenylamino.

$X_1$ is preferably halogen, for example fluorine, chlorine or bromine and especially chlorine or fluorine.

$T_2$, $X_2$ and $X_3$ as halogen are, for example, fluorine, chlorine or bromine, especially chlorine or fluorine.

$X_2$ as $C_1$–$C_4$alkylsulfonyl is, for example, ethylsulfonyl or methylsulfonyl and especially methylsulfonyl.

$X_3$ as $C_1$–$C_4$alkyl is, for example, methyl, ethyl, n- or iso-propyl, n-, iso- or tert-butyl and especially methyl.

$X_2$ and $X_3$ are preferably each independently of the other chlorine or fluorine.

$T_2$ is preferably cyano or chlorine.

Hal is preferably bromine.

alk and $alk_1$ are each independently of the other, for example, a methylene, ethylene, 1,3-propylene, 1,4-butylene, 1,5-pentylene or 1,6-hexylene radical or a branched isomer thereof.

alk and $alk_1$ are preferably each independently of the other a $C_1$–$C_4$alkylene radical and especially an ethylene radical or propylene radical.

arylene is preferably a 1,3- or 1,4-phenylene radical unsubstituted or substituted, for example, by sulfo, methyl, methoxy or by carboxy, and especially an unsubstituted 1,3- or 1,4-phenylene radical.

Q is preferably —NH— or 4 and especially —O—.

W is preferably a group of formula, —CONH— or —NHCO—, especially a group of formula —CONH—.

n is preferably the number 0.

The reactive radicals of formulae (3a) to (3f) are preferably those wherein W is a group of formula —CONH—, $R_1$, $R_2$ and $R_3$ are each hydrogen, Q is a radical —O— or —NH—, alk and $alk_1$ are each independently of the other ethylene or propylene, arylene is phenylene unsubstituted or substituted by methyl, methoxy, carboxy or by sulfo, Y is vinyl or β-sulfatoethyl, $Y_1$ is —CHBr—$CH_2$Br or —CBr=$CH_2$ and n is the number 0.

A fibre-reactive radical present in $D_1$ and $D_2$ corresponds especially to a radical of formula (2a), (2c), (2d), (2e) or (2f) wherein Y is vinyl, β-chloroethyl or β-sulfatoethyl, Hal is bromine, $R_2$ and $R_{1a}$ are hydrogen, m is a number 2 or 3, $X_1$ is halogen, $T_1$ is $C_1$–$C_4$alkoxy, $C_1$–$C_4$alkylthio hydroxy, amino, N-mono- or N,N-di-$C_1$–$C_4$alkylamino unsubstituted or substituted in the alkyl moiety by hydroxy, sulfato or by sulfo, morpholino, or phenylamino or N—$C_1$–$C_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula (3a'), (3b'), (3c'), (3d')

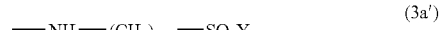

(3a')

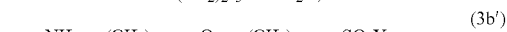

(3b')

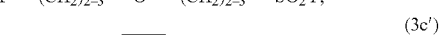

(3c')

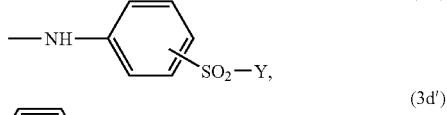

(3d') or

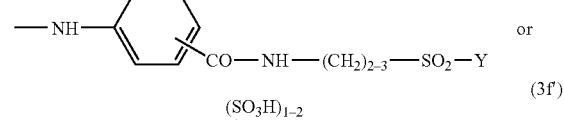

(3f')

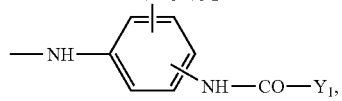

especially (3c') or (3d'), wherein

Y is as defined above, and $Y_1$ is a group —CH(Br)—$CH_2$—Br or —C(Br)=$CH_2$.

In the case of the radicals of formulae (3a') and (3b'), Y is preferably β-chloroethyl. In the case of the radicals of formulae (3c') and (3d'), Y is preferably vinyl or β-sulfatoethyl.

A particular embodiment of the present invention relates to dyes wherein a radical present in $D_1$ and $D_2$ corresponds to formula (2h)

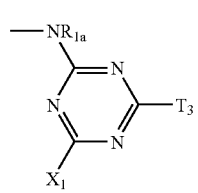

(2h)

wherein $R_{1a}$ and $X_1$ are as defined above and have the preferred meanings given above, and $T_3$ is a monoazoamino or disazoamino radical of formula (4) or (5)

$$D\_13\ N=N\text{-}(M-N=N)_u-K-NR_1-\quad (4)\ \text{or}$$

$$-NR_1-D-N=N\text{-}(M-N=N)_u-K\quad (5)$$

wherein

D is the radical of a diazo component, of the benzene or naphthalene series,

M is the radical of a central component, of the benzene or naphthalene series,

K is the radical of a coupling component, of the benzene, naphthalene, pyrazolone, 6-hydroxypyrid-2-one or acetoacetic acid arylamide series, $R_1$ is as defined above and has the preferred meanings given above, u is a number 0 or 1, wherein D, M and K may carry substituents customary for azo dyes.

The expression "substituents customary for azo dyes" is intended to include both fibre-reactive and non-fibre-reactive substituents, for example the substituents mentioned above for $D_1$ and $D_2$.

As non-fibre-reactive substituents for D, M and K in $T_3$ there come into consideration especially $C_1$–$C_4$alkyl or $C_1$–$C_4$alkoxy unsubstituted or further substituted by hydroxy, sulfo or by sulfato, halogen, carboxy, sulfo, nitro, cyano, trifluoromethyl, sulfamoyl, carbamoyl, amino, ureido, hydroxy, sulfomethyl, $C_2$–$C_4$alkanoylamino, benzoylamino unsubstituted or substituted in the phenyl ring by $C_1$–$C_4$alkyl, $C_1$–$C_4$alkoxy, halogen or by sulfo, or phenyl unsubstituted or substituted by $C_1$–$C_4$alkyl, $C_1$–$C_4$alkoxy, halogen, carboxy or by sulfo.

The monoazoamino or disazoamino radicals of formula (4) or (5) preferably contain at least one sulfo group.

Preferred monoazoamino or disazoamino radicals $T_3$ are the radicals of formulae (6a), (6b), (6c), (6d), (6e), (6f), (6g), (6h), (6i), (6j), (6k), (6l), (6m), (6n),(6o) and (6p)

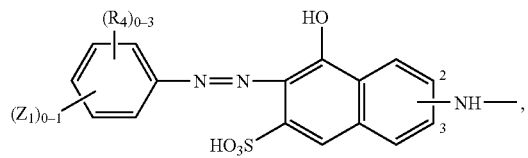

(6a)

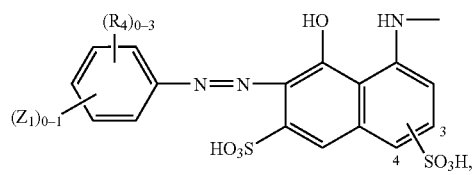

(6b)

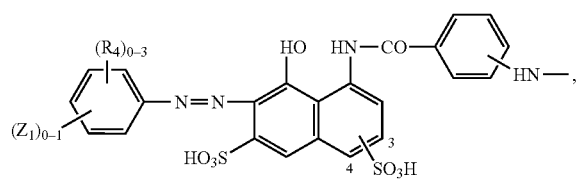

(6c)

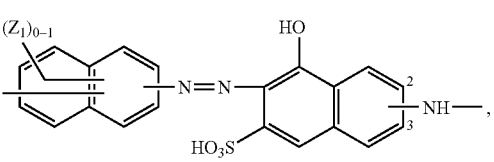

(6d)

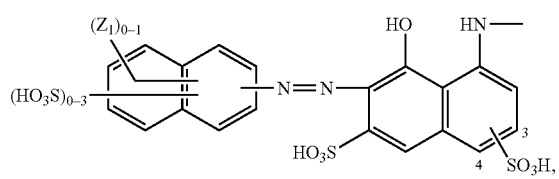

(6e)

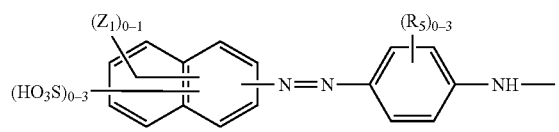

(6f)

wherein $(R_4)_{0-3}$ denotes from 0 to 3 identical or different substituents selected from the group $C_1$–$C_4$alkyl, $C_1$–$C_4$alkoxy, halogen, carboxy and sulfo, $(R_5)_{0-3}$ denotes from 0 to 3 identical or different substituents selected from the group halogen, nitro, cyano, trifluoromethyl, sulfamoyl, carbamoyl, $C_1$–$C_4$alkyl, $C_1$–$C_4$alkoxy unsubstituted or substituted by hydroxy, sulfato or by $C_1$–$C_4$alkoxy, amino, $C_2$–$C_4$alkanoylamino, ureido, hydroxy, carboxy, sulfomethyl, $C_1$–$C_4$alkylsulfonylamino and sulfo, and $Z_1$ is a radical of formula (2a), (2c), (2d), (2e), (2f) or (2g), preferably (2a), (2c), (2d), or (2e) and especially (2a), the mentioned radicals having the definitions and preferred meanings given above,

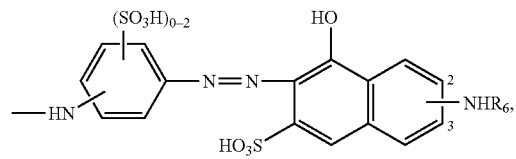
(6g)

wherein $R_6$ is $C_2$–$C_4$alkanoyl or benzoyl,

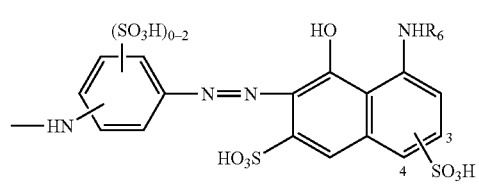
(6h)

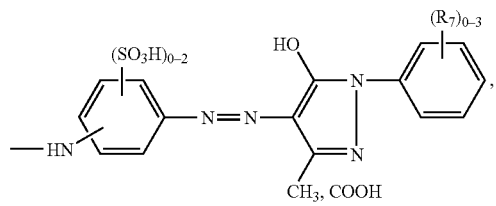
(6i)

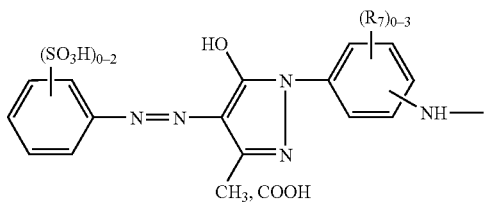
(6j)

wherein $(R_7)_{0-3}$ denotes from 0 to 3 identical or different substituents selected from the group $C_1$–$C_4$alkyl, $C_1$–$C_4$alkoxy, halogen, carboxy and sulfo,

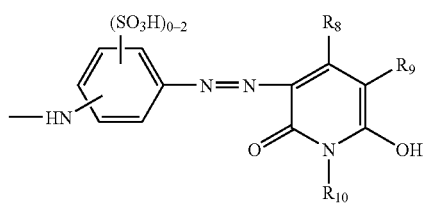
(6k)

wherein $R_8$ and $R_{10}$ are each independently of the other hydrogen, $C_1$–$C_4$alkyl or phenyl, and $R_9$ is hydrogen, cyano, carbamoyl or sulfomethyl,

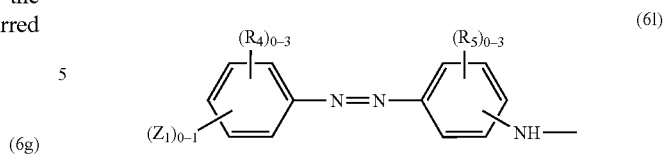
(6l)

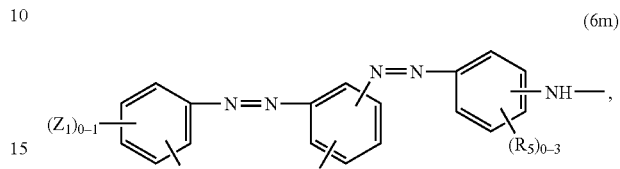
(6m)

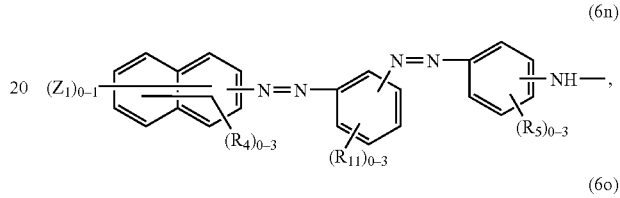
(6n)

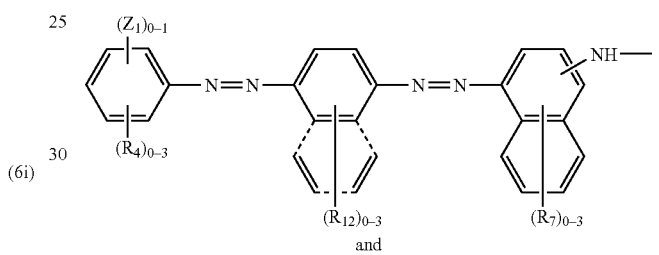
(6o)
and

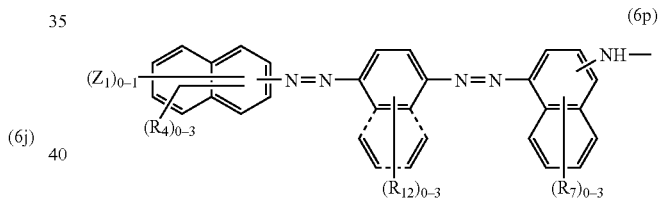
(6p)

wherein $(R_4)_{0-3}$, $(R_5)_{0-3}$ and $(R_7)_{0-3}$ are each as defined above, $(R_{11})_{0-3}$ and $(R_{12})_{0-3}$ each independently of the other denote from 0 to 3 identical or different substituents selected from the group $C_1$–$C_4$alkyl, $C_1$–$C_4$alkoxy, halogen, carboxy and sulfo, and $Z_1$ is as defined above and has the preferred meanings given above.

The numbers on the naphthyl rings of the radicals of formulae (6a), (6b), (6c), (6d), (6e), (6g) and (6h) indicate the possible bonding positions.

$(R_4)_{0-3}$ in the disazoamino radicals of formulae (6n) and (6p) preferably denotes from 0 to 3 sulfo groups.

Especially preferred monoazoamino or disazoamino radicals $T_3$ are the radicals of formulae (6a), (6b), (6d), (6e), (6f), (6k) and (6m), especially (6b), (6k) and (6m).

Preferably only one of the radicals $D_1$ and $D_2$ contains a radical of formula (2h) wherein $R_{1a}$, $X_1$ and $T_3$ are as defined above and have the preferred meanings given above.

$D_1$ and $D_2$ each independently of the other as a radical of an unsubstituted or substituted diazo component, of the benzene or naphthalene series, are, for example, phenyl or naphthyl, each of which is unsubstituted or is substituted, for example by $C_1$–$C_4$alkyl, $C_1$–$C_4$alkoxy, halogen, sulfo, nitro, carboxy or by a fibre-reactive radical of formula (2a), (2b), (2c), (2d), (2e), (2f) or (2g), especially (2a), (2c), (2d), (2e) or (2f), the mentioned fiber-reactive radicals having the definitions and preferred meanings given above.

$D_1$ and $D_2$ each independently of the other as a radical of an unsubstituted or substituted diazo component, of the benzene or naphthalene series, also include monoazo radicals, for example those of formula (7) or (8)

—D*—N=N—K* (7) or

D*—N=N—K**— (8), preferably of formula (8), wherein D* is the radical of a diazo component, of the benzene or naphthalene series, K* is the radical of a coupling component, of the benzene, naphthalene, pyrazolone, 6-hydroxypyrid-2-one or acetoacetic acid arylamide series, and K** is the radical of a coupling component, of the benzene or naphthalene series, wherein D*, K* and K** may carry substituents customary for azo dyes.

As non-fibre-reactive substituents for D*, K* and K** there come into consideration preferably $C_1$–$C_4$alkyl or $C_1$–$C_4$alkoxy unsubstituted or further substituted by hydroxy, $C_1$–$C_4$alkoxy, sulfo or by sulfato, halogen, carboxy, sulfo, nitro, cyano, trifluoromethyl, sulfamoyl, carbamoyl, amino, ureido, hydroxy, sulfomethyl, $C_1$–$C_4$alkanoylamino, $C_1$–$C_4$alkylsulfonylamino, benzoylamino unsubstituted or substituted in the phenyl ring by $C_1$–$C_4$alkyl, $C_1$–$C_4$alkoxy, halogen or by sulfo, or phenyl unsubstituted or substituted by $C_1$–$C_4$alkyl, $C_1$–$C_4$alkoxy, halogen, carboxy or by sulfo.

As fibre-reactive substituents for D*, K* and K** there come into consideration preferably the radicals of formulae (2a), (2c), (2d), (2e) and (2f), especially (2a) and (2f) and more especially (2a), the mentioned radicals having the definitions and preferred meanings given above. In an interesting embodiment, preference is given to a radical of formula (2a) as fibre-reactive substituent for D* and to a radical of formula (20 as fibre-reactive substituent for K**.

Preferably only one of the radicals $D_1$ and $D_2$ contains a monoazo radical of formula (7) or (8) wherein D*, K* and K** are as defined above and have the preferred meanings given above.

The monoazo radicals of formulae (7) and (8) preferably contain at least one sulfo group.

Preferred monoazo radicals $D_1$ and $D_2$ of formula (8) correspond to the radicals of formulae (8a), (8b), (8c), (8d), (8e), (8f), (8g), (8h), (8i) and (8j)

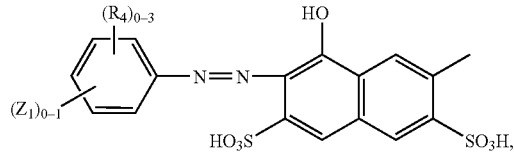
(8a)

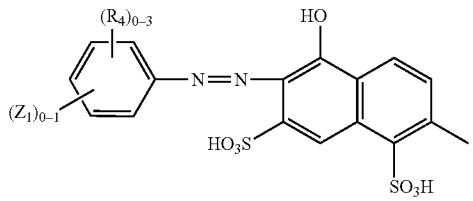
(8b)

-continued

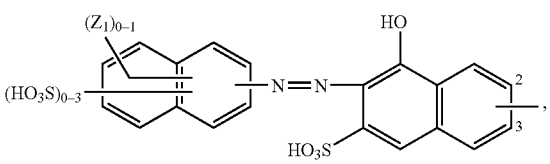
(8c)

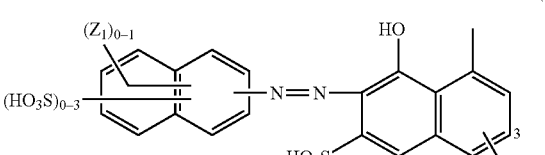
(8d)

wherein $(R_4)_{0-3}$ denotes from 0 to 3 identical or different substituents selected from the group $C_1$–$C_4$alkyl, $C_1$–$C_4$alkoxy, halogen, carboxy and sulfo, and $Z_1$ is a fibre-reactive radical of formula (2a), (2c), (2d), (2e), (2f) or (2g), preferably (2a), (2c), (2d) or (2e) and especially (2a), the mentioned fibre-reactive radicals having the definitions and preferred meanings given above,

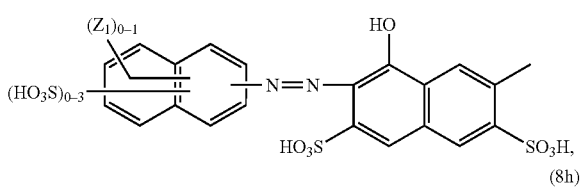
(8e)

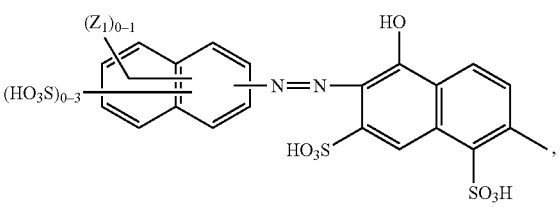
(8f)

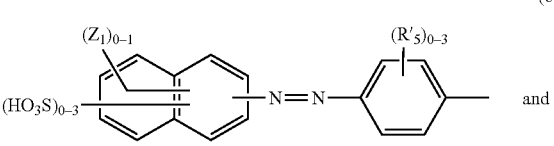
(8g)

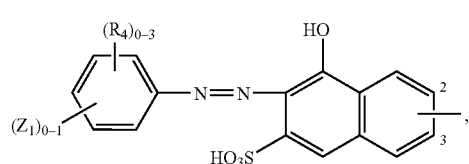
(8h)

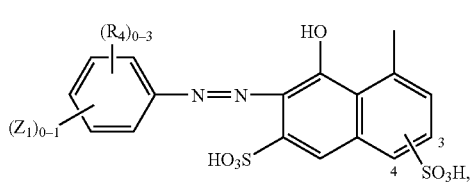
(8i)

and

-continued

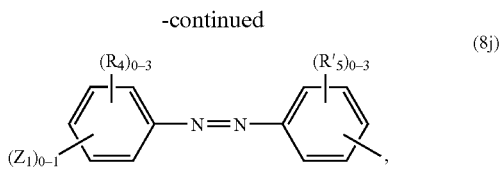
(8j)

wherein $(R_4)_{0-3}$ is as defined above. $(R'_5)_{0-3}$ denotes from 0 to 3 identical or different substituents selected from the group halogen, nitro, cyano, trifluoromethyl, sulfamoyl, carbamoyl, $C_1$–$C_4$alkyl, $C_1$–$C_4$alkoxy unsubstituted or substituted by hydroxy, sulfato or by $C_1$–$C_4$alkoxy, amino, $C_2$–$C_4$alkanoylamino, ureido, hydroxy, carboxy, sulfomethyl, $C_1$–$C_4$alkylsulfonylamin sulfo and a fibre-reactive radical of formula (2f) wherein the radicals $R_{1a}$, $T_1$ and $X_1$ are as defined above and have the preferred meanings given above and $Z_1$ is as defined above and has the preferred meanings given above.

The numbers on the naphthyl rings of the radicals of formulae (8a), (8b), (8e) and (8f) indicate the possible bonding positions.

The radicals $D_1$ and $D_2$ in the dyes of formulae (1aa) and (1ab) according to the invention are identical or non-identical.

As an aromatic tetraazo component, $D_3$ is, for example, phenylene or naphthylene unsubstituted or substituted by $C_1$–$C_4$alkyl, $C_1$–$C_4$alkoxy, $C_2$–$C_4$alkanoylamino, sulfo, halogen or by carboxy, or a radical of formula (9)

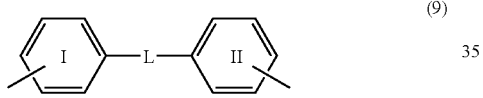
(9)

wherein benzene rings 1 and 11 are unsubstituted or substituted by $C_1$–$C_4$alkyl, $C_1$–$C_4$alkoxy, $C_2$–$C_4$alkanoylamino, sulfo, halogen or by carboxy and L is a direct bond or a $C_2$–$C_{10}$alkylene radical which may be interrupted by 1, 2 or 3 oxygen atoms, or L is a bridging member of formula —CH═CH—, —N═N—, —NH—, —CO—, —NH—CO—, —NH—SO$_2$—, —NH—CO—NH—, —O—, —S— or —SO$_2$—.

Preferably, the tetraazo components mentioned for $D_3$ are unsubstituted or substituted by sulfo.

As an aromatic tetraazo component there also comes into consideration for $D_3$ a radical of formula (10)

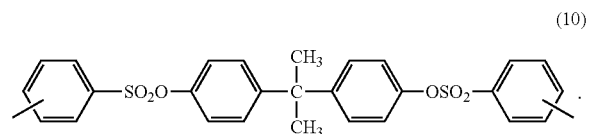
(10)

$D_3$ is preferably a naphthylene substituted by from 1 to 3, preferably 2, sulfo groups, a radical of formula (10), or a radical of formula (9) wherein benzene rings 1 and 11 are unsubstituted or substituted by 1 or 2 sulfo groups and L is a direct bond, a $C_2$–$C_4$alkylene radical or a bridging member of formula —CH═CH—, —NH—, —CO—, —NH—CO—, —NH—SO$_2$—, —NH—CO—NH—, —O—, —S— or —SO$_2$—.

Y in the reactive dye according to the invention containing at least one structural unit of formula (1) is as defined above and has the preferred meanings given above.

In a preferred embodiment, the reactive dyes of formula (1) correspond to formula (1aa).

The radicals $D_1$ and $D_2$ preferably correspond, each independently of the other, to a radical of formula (11) or (12)

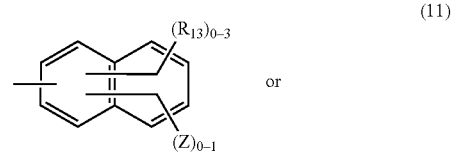
(11)

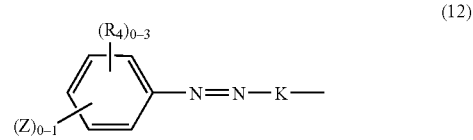
(12)

wherein $(R_4)_{0-3}$ and $(R_{13})_{0-3}$ each independently of the other denote from 0 to 3 identical or different substituents selected from the group halogen, $C_1$–$C_4$alkyl, $C_1$–$C_4$alkoxy, carboxy and sulfo, K is the radical of a coupling component of formula (13a) or (13b)

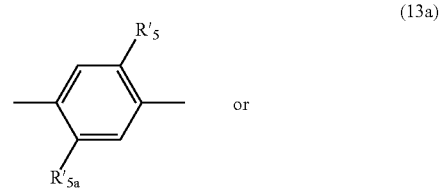
(13a)

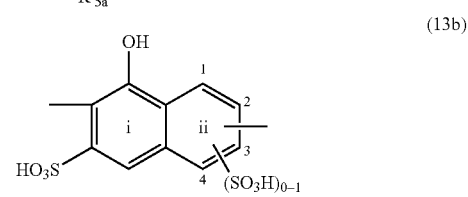
(13b)

and

Z and $Z_1$ are each independently of the other a radical of formula (2a), (2c), (2d), (2e) or (2f), wherein $R_{1a}$ and $R_2$ are hydrogen, Hal is bromine, Y is vinyl, β-chloroethyl or β-sulfatoethyl, $T_1$ is $C_1$–$C_4$alkoxy, $C_1$–$C_4$alkylthio, hydroxy, amino, N-mono- or N, N-di-$C_1$–$C_4$alkylamino unsubstituted or substituted in the alkyl moiety by hydroxy, sulfato or by sulfo, morpholino, or phenylamino or N—$C_1$–$C_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula (3c') or (3d'), and Y is as defined above, $X_1$ is chlorine or fluorine, m is a number 2 or 3, R′$_5$ is hydrogen, sulfo, or C$_1$–C$_4$alkoxy unsubstituted or substituted in the alkyl moiety by hydroxy or by sulfato, R′$_{5a}$ is hydrogen, C$_1$–C$_4$alkyl, C$_1$–C$_4$alkoxy, C$_2$–C$_4$alkanoylamino, ureido or a radical of formula (2f) wherein the radicals R$_{1a}$, T$_1$ and X$_1$ are as defined above.

As C$_1$–C$_4$alkyl, R$_4$, R′$_{5a}$ and R$_{13}$ may be, each independently of the others, for example, methyl, ethyl, n-propyl, isopropyl, n-butyl, sec-butyl, tert-butyl or isobutyl, preferably methyl or ethyl and especially methyl.

As C$_1$–C$_4$alkoxy, R$_4$, R′$_5$, R′$_{5a}$ and R$_{13}$ may be, each independently of the others, for example, methoxy, ethoxy, n-propoxy, isopropoxy, n-butoxy or isobutoxy, preferably methoxy or ethoxy and especially methoxy. R′$_5$ is unsubstituted or may be substituted in the alkyl moiety by hydroxy or by sulfato.

As halogen, R$_4$ and R$_{13}$ may be, each independently of the other, for example, fluorine, chlorine or bromine, preferably chlorine or bromine and especially chlorine.

As C$_2$–C$_4$alkanoylamino, R′$_{5a}$, may be, for example, acetylamino or propionylamino, especially acetylamino.

As a radical of formula (2f), R′$_{5a}$ is preferably a radical wherein

R$_{1a}$ is hydrogen,

T$_1$ is amino, N-mono- or N,N-di-C$_1$–C$_4$alkylamino unsubstituted or substituted in the alkyl moiety by hydroxy, sulfato or by sulfo, morpholino, or phenylamino or N—C$_1$–C$_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy, or naphthylamino unsubstituted or substituted by from 1 to 3 sulfo groups, and X$_1$ is fluorine or chlorine.

In the radical of the coupling component of formula (13b), the sulfo group in ring ii is preferably bonded in the 3- or 4-position. When ring ii contains a sulfo group, the radical of formula (13b) is preferably bonded in the 1-, 2- or 3-position of ring ii. When ring ii does not contain a sulfo group, the radical of formula (13b) is preferably bonded in the 2- or 3-position of ring ii.

The radicals D$_1$ and D$_2$ especially correspond, each independently of the other, to a radical of formula (11a), (11b), (11c), (11d) or (12a)

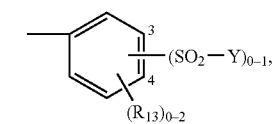

(11a)

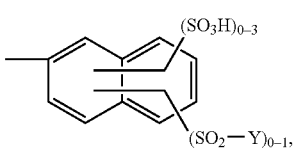

(11b)

(11c)

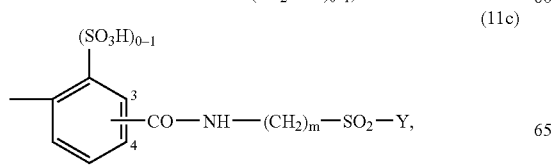

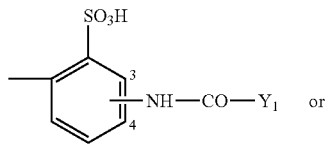

(11d)

or

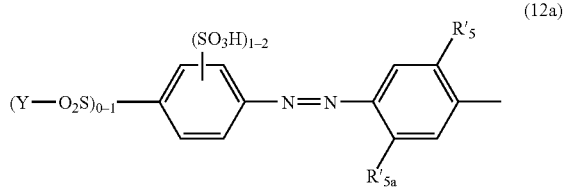

(12a)

wherein

R′$_5$ is hydrogen, sulfo, or ethoxy unsubstituted or substituted in the alkyl moiety by hydroxy or by sulfato, R′$_{5a}$ is hydrogen, methyl, ethyl, methoxy, ethoxy, acetylamino, propionylamino or ureido, (R$_{13}$)$_{0-2}$ denotes from 0 to 2 identical or different substituents selected from the group halogen, C$_1$–C$_4$alkyl, C$_1$–C$_4$alkoxy and sulfo, especially methyl, methoxy and sulfo, Y$_1$ is a group —CH(Br)—CH$_2$—Br or —C(Br)=CH$_2$, Y is vinyl, β-chloroethyl or β-sulfatoethyl, especially vinyl or β-sulfatoethyl, and m is a number 2 or 3, especially 2.

The numbers in the radicals of formulae (11a), (11c) and (11d) indicate the possible bonding positions of the fibre-reactive radical.

Preferably, D$_1$ and D$_2$ are each independently of the other a radical of formula (11a), (11b) or (12a).

In the above-mentioned particular embodiment of the present invention wherein a radical present in D$_1$ and D$_2$ corresponds to formula (2h), one of the radicals D$_1$ and D$_2$ is preferably a radical of formula (14)

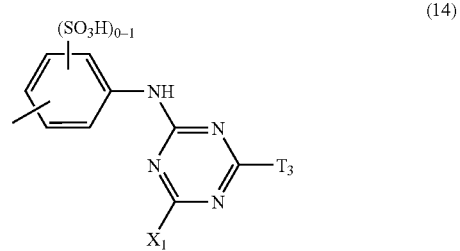

(14)

wherein

X$_1$ is chlorine or fluorine, especially chlorine, and

T$_3$ is a monoazoamino or disazoamino radical of formula (6a), (6b), (6d), (6e), (6f), (6k) or (6m), the radicals (R$_4$)$_{0-3}$, (R$_5$)$_{0-3}$, R$_8$, R$_9$, R$_{10}$ and (R$_{11}$)$_{0-3}$ being as defined above, and Z$_1$ is a radical of formula (2a), (2c'), (2d') or (2e')

—SO$_2$—Y (2a),

—CONH—(CH$_2$)$_{2-3}$—SO$_2$—Y (2c'),

—NH—CO—CH(Br)—CH$_2$—Br (2d') or

—NH—CO—C(Br)=CH$_2$ (2e'), preferably (2a), wherein Y is vinyl, β-chloroethyl or β-sufatoethyl, especially vinyl or β-sulfatoethyl; and the other of the radicals $D_1$ and $D_2$ is a radical of formula (11a), (11b), (11c) or (11d), the radicals $(R_{13})_{0-2}$, $Y_1Y_1$ and m having the definitions and preferred meanings given above.

Preference is given to the reactive dyes of formula (1aa) wherein

Y is vinyl, β-chloroethyl or β-sulfatoethyl, and $D_1$ and $D_2$ are each independently of the other a radical of formula (11) or (12) wherein K is the radical of a coupling component of formula (13a) or (13b) and the radicals $(R_4)_{0-3}$, $(R_{13})_{0-3}$, Z, $Z_1$, $R'_5$ and $R'_{5a}$ are as defined above and have the preferred meanings given above.

The present invention relates also to a process for the preparation of the reactive dyes according to the invention, which process comprises coupling one or more than one diazotised amine, together or in any order, to a compound containing at least one structural unit of formula (15)

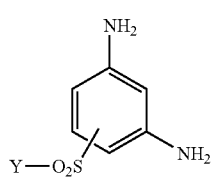

(15)

so that a reactive dye containing at least one structural unit of formula (1) is obtained.

'More than one diazotised amine' is, for example, two or three diazotised amines.

Amines that are suitable for the preparation of the reactive dyes according to the invention are, for example, aromatic amines of the benzene or naphthalene series which can be diazotised and coupled according to methods known per se, such as those described, for example, in Venkataraman "The Chemistry of Synthetic Dyes" Volume 1, pages 210–214 and 409–441, Academic Press, New York, London 1952.

The diazotisation of the amines is effected in customary manner, for example using a nitrite, e.g. an alkali metal nitrite such as sodium nitrite, in a mineral acid medium, for example a hydrochloric-acid-containing medium, at temperatures of, for example, from −5 to 40° C., preferably from −5 to 10° C. and especially from 0 to 5° C.

The coupling to the coupling component of formula (15) is effected in a manner known per se at acidic or neutral to weakly alkaline pH values, for example at a pH value of from 1 to 10, advantageously from 3 to 7 and preferably from 4.5 to 6.5, and at temperatures of, for example, from −5 to 40° C., preferably from 0 to 30° C.

The reactive dyes of formula (1aa) according to the invention are prepared, for example, by reacting with one another approximately 1 molar equivalent each of compounds of formulae

(16a)

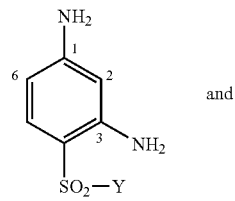

(15a)

and

(16b)

wherein the variables are as defined above and have the preferred meanings given above, by diazotising the amines of formulae (16a) and (16b) and coupling to the compound of formula (15a) in any order.

The order in which the diazotised compounds of formulae (16a) and (16b) are coupled with the compound of formula (15a) governs the position of the second amino group in the reactive dyes of formula (1aa). The first diazo component is generally coupled in the 6-position of the compound of formula (15a) and the second diazo component in the 2-position.

The present invention accordingly relates also to reactive dyes of formula (15b)

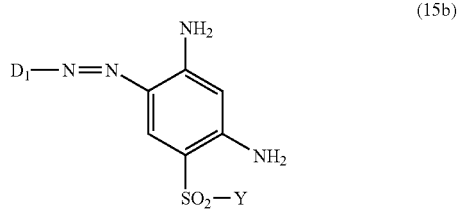

(15b)

wherein $D_1$ is the radical of a diazo component, of the benzene or naphthalene series, and Y is vinyl or a radical —$CH_2$—$CH_2$—U and U is a group removable under alkaline conditions.

The reactive dyes of formula (15b) are obtained by coupling approximately 1 molar equivalent of a compound of formula (16a) to approximately 1 molar equivalent of a compound of formula (15a).

The reactive dyes of formula (1ab) according to the invention wherein $D_1=D_2$ are prepared, for example, by first reacting approximately 1 molar equivalent of a tetraazotised diamine of formula (16c)

(16c)

with approximately 2 molar equivalents of a compound of formula (15a) to form a compound of formula (17)

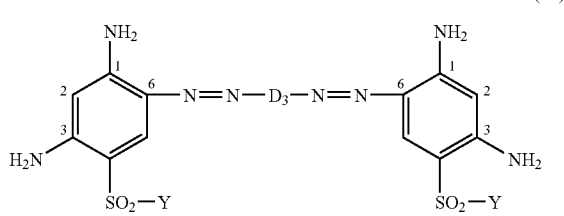

and reacting the compound of formula (17) with approximately 2 molar equivalents of a diazotised amine of formula (16a), the variables having the definitions and preferred meanings given above.

The reactive dyes of formula (1ab) according to the invention wherein $D_1 \neq D_2$ may be obtained, for example, by proceeding as described above but using, instead of one diazotised amine of formula (16a), an equimolar amount of a mixture of, for example, two diazotised amines of formulae (16a) and (16b) in a molar ratio of, for example, 1:1. Such dyes are usually obtained in the form of mixtures.

The compound of formula (15) or (15a) and the compounds of formulae (16a), (16b) and (16c) are known or can be prepared analogously to known compounds.

The compound of formula (15) or (15a) is described, for example, in U.S. Pat. No. 4,897,469 and U.S. Pat. No. 5,424,405 and is prepared, for example, by first reacting the compound of formula (18)

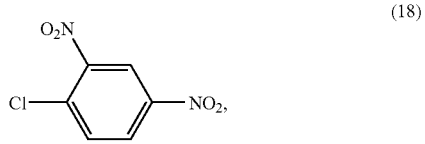

which is known per se, with 2-mercaptoethanol, oxidising the resulting compound to form the sulfonyl compound of formula (19)

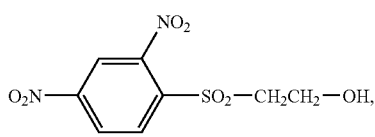

introducing a suitable leaving group U, and reducing the two nitro groups to form amino groups.

The reaction of the known compounds of formula (18) with 2-mercaptoethanol is carried out, for example, in a suitable solvent in the presence of potassium fluoride at elevated temperature, for example from 50 to 100° C. Suitable solvents therefor are, for example, water, lower alcohols, dioxane, toluene, xylenes, mono- or di-chlorobenzene, N,N-dimethylformamide and N-methylpyrrolidone.

The oxidation of the thioether compounds to form sulfones can be effected by various methods, for example using hydrogen peroxide with or without addition of suitable catalysts such as, for example, tungsten or vanadium compounds, or using peracetic acid, potassium permanganate or chromic acid, or using chlorine/hydrochloric acid each in an aqueous, aqueous-organic or organic medium.

The conversion of the hydroxyethylsulfonyl radical into a suitable reactive radical, for example into a sulfatoethylsulfonyl, thiosulfatoethylsulfonyl, phosphatoethylsulfonyl or vinylsulfonyl radical, is effected according to customary methods known per se.

The reduction of the nitro groups is likewise effected in a manner known per se, for example by catalytic hydrogenation using Pd/carbon in ethanol, ethyl acetate or tetrahydrofuran at from room temperature to about 40° C., or using Fe/hydrochloric acid or Fe/acetic acid in aqueous solution.

The reactive dyes according to the invention are present either in the form of their free acid or, preferably, in the form of their salts. Suitable salts are, for example, alkali metal, alkaline earth metal or ammonium salts or salts of an organic amine. Examples that may be mentioned are sodium, lithium, potassium or ammonium salts or a mono-, di- or tri-ethanolamine salt.

The reactive dyes according to the invention are suitable for dyeing and printing a wide variety of materials, especially hydroxyl-group-containing or nitrogen-containing fibre materials. Examples include paper, silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention accordingly relates also to the use of reactive dyes of formula (1) in the dyeing or printing of hydroxyl-group-containing or nitrogen-containing, especially cotton-containing, fibre materials.

The reactive dyes according to the invention can be applied to the fibre material and fixed to the fibre in a variety of ways, especially in the form of aqueous dye solutions or dye print pastes. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength and a high fibre-dye binding stability in both the acidic and the alkaline range, and also good fastness to light and very good wet-fastness properties, such as fastness to washing, to water, to seawater, to cross-dyeing and to perspiration. The dyeings obtained exhibit fibre levelness and surface levelness.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to litres.

EXAMPLE 1 a) 217 parts of potassium fluoride are introduced into a solution of 500 parts of 2,4-dinitro-1-chlorobenzene in 590 parts of N,N-dimethylformamide (DMF) and the reaction mixture is stirred for 5 hours at room temperature. 350 parts of 2-mercaptoethanol are then added dropwise, whereupon the internal temperature rises to from 60 to 65° C., and stirring is then carried out for about 15 hours at that temperature. Then, any starting materials still present are made to react by adding 34 parts of potassium carbonate. Finally, the mixture is left to cool to room temperature, salts are filtered off and the filtrate is concentrated. The oily crude product is discharged onto water, whereupon a yellow crystalline precipitate separates out. After filtering off under suction, washing and drying, 2-[2,4-dinitrophenylsulfanyl] ethanol is obtained in an almost quantitative yield and high purity.

b) A suspension of 220 parts of Oxone® in 150 parts of water is introduced into a solution of 140 parts of 2-[2,4-dinitrophenylsulfanyl]ethanol in 1100 parts of methanol and the reaction mixture is refluxed for about 1 hour, with stirring. There are then added 3.5 parts of ammonium heptamolybdate dissolved in a small amount of water, and also 30 parts of 30% hydrogen peroxide, and stirring is carried out, under reflux, until the reaction has ceased. After the reaction is complete, saturated sodium disulfite solution is added until peroxide is no longer detectable; the mixture is cooled to from 0 to 5° C., salts are filtered off and the filtrate is concentrated. The product that crystallises out is filtered off under suction, washed and dried. 2-[2,4-Dinitrophenylsulfonyl]ethanol is obtained in a good yield.

c) 105 parts of 2-[2,4-dinitrophenylsulfonyl]ethanol are slowly introduced, at from 0 to 5° C., into 380 parts of sulfuric acid monohydrate and stirring is carried out for 14 hours at that temperature. The brown solution obtained is then slowly discharged onto a mixture of ice and 20% sodium chloride solution, whereupon a yellowish suspension is formed. The precipitate is filtered off and washed first with 1000 parts of cold 20% sodium chloride solution and then with 200 parts of ice-water. After drying, 2-[2,4-dinitrophenylsulfonyl]ethyl hydrogen sulfate is obtained in a very good yield and very good purity.

d) 19 parts of acetic acid are added, at 80° C., to a suspension of 180 parts of iron in 500 parts of water and stirred for 5 minutes. The mixture is then cooled to 60° C. and 150 parts of 2-[2,4-dinitrophenylsulfonyl]ethyl hydrogen sulfate are slowly introduced. After 30 minutes, the reaction mixture is cooled to from 0 to 5° C., and the insoluble constituents are filtered off. The filtrate is concentrated. After drying, the compound of formula (101) is obtained.

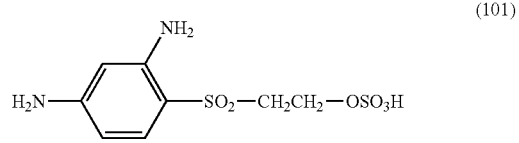

EXAMPLE 2 a) 36.9 parts of cyanuric chloride are stirred in 150 parts of ice/water and a small amount of a wetting agent. At from 0 to 2° C., a solution of 25.25 parts of taurine in 50 parts of water is allowed to run in over the course of 40 minutes, and condensation is carried out at a pH of from 7 to 8 by dropwise addition of 2N sodium hydroxide solution. Stirring is then carried out at from 0 to 5° C. and at a pH of from 7 to 7.5 until cyanuric chloride is no longer detectable. A neutral solution of 39.48 parts of 1,3-phenylenediamine-4-sulfonic acid in 100 parts of water is then added. Condensation is carried out at a temperature of from 5 to 20° C. and the pH is maintained at from 8 to 9 by adding 2N sodium hydroxide solution. After the condensation is complete, the reaction solution is salted out using KCl, filtered and washed with concentrated KCl solution. After drying, there is obtained the intermediate of formula

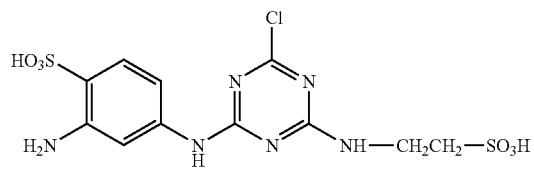

b) 89.3 parts of the compound according to a) are suspended in 400 parts of water. Then, at from 0 to 5° C., 41.4 parts of 2-(4-amino-phenylsulfonyl)ethyl hydrogen sulfate diazotised by a customary procedure (see Example 5 below) are added over the course of 10 minutes and the pH is maintained at from 6 to 8.5 using 20% sodium carbonate solution. After coupling is complete, the yellow dye is precipitated out using KCl, and the resulting suspension is filtered and dried in vacuo. There is obtained the monoazo compound of formula

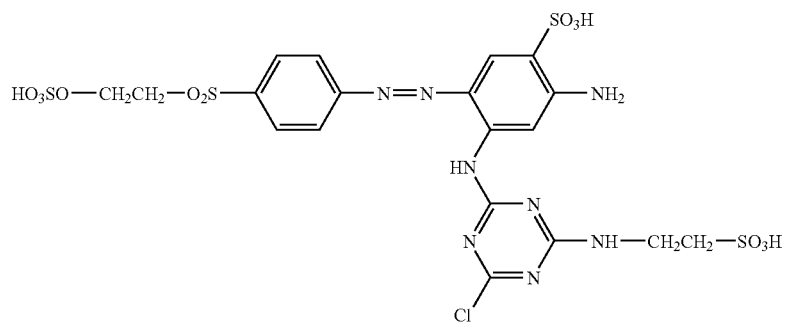

EXAMPLE 3

17.3 parts of an amine of formula $D_{10}$-$NH_2$ wherein $D_{10}$ is a radical of formula

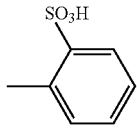

are introduced into 215 parts of water and stirred well. At 0° C., 25 parts of 4N sodium nitrite solution are added to the solution obtained, and then 20 parts of concentrated hydrochloric acid are slowly added dropwise at from 0 to 5° C. Stirring is carried out for 1 hour at that temperature.

EXAMPLE 4

56.2 parts of an amine of formula $D_{11}$-$NH_2$ wherein $D_{11}$ is a radical of formula

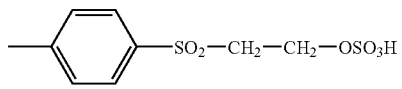

are introduced into 220 parts of water and stirred well. At 10° C., first 50 parts of 4N sodium nitrite solution and then 90 parts of 31% naphthalenesulfonic acid solution are added to the suspension obtained. Stirring is then carried out for 3 hours at from 15 to 20° C.

EXAMPLES 5 to 36

The diazo compounds of the amines indicated in Table 1 can be prepared analogously to the procedure described in Example 3 or 4 by using, instead of the amine of formula $D_{10}$-$NH_2$ or $D_{11}$-$NH_2$ indicated in Example 3 or 4, an equimolar amount of an amine of formula $D_{xy}$-$NH_2$ indicated in Table 1.

TABLE 1

| Ex. | Amine $D_{xy}$-$NH_2$ | $D_{xy}$ |
|---|---|---|
| 5 | $D_{12}$-$NH_2$ | $D_{12}$ = 3-($SO_2$—$CH_2$—$CH_2$—$OSO_3H$)-phenyl |
| 6 | $D_{13}$-$NH_2$ | $D_{13}$ = 2-$HO_3S$, 5-($SO_2$—$CH_2$—$CH_2$—$OSO_3H$)-phenyl |
| 7 | $D_{14}$-$NH_2$ | $D_{14}$ = 2-$HO_3S$, 5-(HN—CO—CHBr—$CH_2$Br)-phenyl |
| 8 | $D_{15}$-$NH_2$ | $D_{15}$ = 4-(CONH—$(CH_2)_2$—$SO_2$—$(CH_2)_2$—Cl)-phenyl |
| 9 | $D_{16}$-$NH_2$ | $D_{16}$ = 2-$HO_3S$, 5-(CONH—$(CH_2)_2$—$SO_2$—$(CH_2)_2$—Cl)-phenyl |
| 10 | $D_{17}$-$NH_2$ | $D_{17}$ = 4-(CONH—$(CH_2)_2$—$SO_2$—$(CH_2)_2$—$OSO_3H$)-phenyl |
| 11 | $D_{18}$-$NH_2$ | $D_{18}$ = 2-$HO_3S$, 5-$SO_3H$-phenyl |

TABLE 1-continued

| Ex. | Amine $D_{xy}$-NH$_2$ | $D_{xy}$ | |
|---|---|---|---|
| 12 | $D_{18a}$-NH$_2$ | $D_{18a}$ = | 2-methyl-4-methoxy-phenyl with HO$_3$S at position 3 (HO$_3$S, CH$_3$, OCH$_3$ substituted benzene) |
| 13 | $D_{19}$-NH$_2$ | $D_{19}$ = | 3-methylphenyl–CONH–(CH$_2$)$_2$–SO$_2$–(CH$_2$)$_2$–OSO$_3$H |
| 14 | $D_{20}$-NH$_2$ | $D_{20}$ = | benzene with OCH$_3$, CH$_3$, and SO$_2$–CH$_2$–CH$_2$–OSO$_3$H substituents |
| 15 | $D_{21}$-NH$_2$ | $D_{21}$ = | benzene with OCH$_3$, CH$_3$ (×2), and SO$_2$–CH$_2$–CH$_2$–OSO$_3$H substituents |
| 16 | $D_{22}$-NH$_2$ | $D_{22}$ = | benzene with OCH$_3$ (×2), CH$_3$, and SO$_2$–CH$_2$–CH$_2$–OSO$_3$H substituents |
| 17 | $D_{23}$-NH$_2$ | $D_{23}$ = | naphthalene with SO$_3$H, CH$_3$, and SO$_2$–CH$_2$–CH$_2$–OSO$_3$H substituents |
| 18 | $D_{24}$-NH$_2$ | $D_{24}$ = | naphthalene with SO$_3$H, CH$_3$, and SO$_2$–CH$_2$–CH$_2$–OSO$_3$H substituents |
| 19 | $D_{25}$-NH$_2$ | $D_{25}$ = | naphthalene with CH$_3$ and SO$_2$–CH$_2$–CH$_2$–OSO$_3$H substituents |
| 20 | $D_{26}$-NH$_2$ | $D_{26}$ = | naphthalene with CH$_3$, SO$_3$H, and SO$_2$–CH$_2$–CH$_2$–OSO$_3$H substituents |

TABLE 1-continued

| Ex. | Amine $D_{xy}$-$NH_2$ | $D_{xy}$ |
|---|---|---|
| 21 | $D_{27}$-$NH_2$ | $D_{27}$ = (4-hydroxy-6-methyl-3-sulfo-naphthalen-2-yl)-azo-(4-(2-sulfooxyethylsulfonyl)phenyl); structure: naphthalene with OH, CH$_3$, SO$_3$H, and N=N–C$_6$H$_4$–SO$_2$(CH$_2$)$_2$OSO$_3$H |
| 22 | $D_{28}$-$NH_2$ | $D_{28}$ = naphthalene with OH, CH$_3$, HO$_3$S, SO$_3$H, and N=N–C$_6$H$_4$–SO$_2$(CH$_2$)$_2$OSO$_3$H |
| 23 | $D_{29}$-$NH_2$ | $D_{29}$ = HO$_3$S–C$_6$H$_3$(CH$_3$)–NH–CO–CHBr–CH$_2$Br |
| 24 | $D_{30}$-$NH_2$ | $D_{30}$ = 2-methylnaphthalene-1-sulfonic acid |
| 25 | $D_{31}$-$NH_2$ | $D_{31}$ = 2-methylnaphthalene-1,5-disulfonic acid |
| 26 | $D_{32}$-$NH_2$ | $D_{32}$ = HO$_3$S–C$_6$H$_3$(CH$_3$)–NHCO–(CH$_2$)$_3$–SO$_2$–(CH$_2$)$_2$–Cl |
| 27 | $D_{33}$-$NH_2$ | $D_{33}$ = HO$_3$S–C$_6$H$_3$(CH$_3$)–NHCO–(CH$_2$)$_3$–SO$_2$–(CH$_2$)$_2$–Cl |
| 28 | $D_{34a}$-$NH_2$–$D_{34r}$-$NH_2$ | $D_{34a}$–$D_{34r}$ = HO$_3$S–C$_6$H$_3$(CH$_3$)–NH–(triazine with $T_1$, Cl) |

TABLE 1-continued

| Ex. | Amine $D_{xy}$-NH$_2$ | $D_{xy}$ | $T_1$: |
|---|---|---|---|
| 28a | $D_{34a}$-NH$_2$ | $D_{34a}$ | —NH—C$_6$H$_4$—SO$_3$H (para) |
| 28b | $D_{34b}$-NH$_2$ | $D_{34b}$ | —NH—C$_6$H$_4$—CH$_3$ (meta) |
| 28c | $D_{34c}$-NH$_2$ | $D_{34c}$ | —NH—C$_6$H$_4$—NHCO—CH$_3$ (meta) |
| 28d | $D_{34d}$-NH$_2$ | $D_{34d}$ | —NH—C$_6$H$_4$—Cl (ortho) |
| 28e | $D_{34e}$-NH$_2$ | $D_{34e}$ | —NHCH$_2$CH$_2$OH |
| 28f | $D_{34f}$-NH$_2$ | $D_{34f}$ | —N(CH$_2$CH$_2$OH)$_2$ |
| 28g | $D_{34g}$-NH$_2$ | $D_{34g}$ | —N(CH$_2$CH$_2$OH)(CH$_2$CH$_3$) |
| 28h | $D_{34h}$-NH$_2$ | $D_{34h}$ | —N(CH$_2$CH$_2$OH)(CH$_3$) |
| 28i | $D_{34i}$-NH$_2$ | $D_{34i}$ | —NH—(CH$_2$)$_2$—O—(CH$_2$)$_2$—OH |
| 28j | $D_{34j}$-NH$_2$ | $D_{34j}$ | —NHCH$_2$CH$_2$SO$_3$H |
| 28k | $D_{34k}$-NH$_2$ | $D_{34k}$ | —N(CH$_2$CH$_2$SO$_3$H)(CH$_3$) |
| 28l | $D_{34l}$-NH$_2$ | $D_{34l}$ | —N(morpholino) |
| 28m | $D_{34m}$-NH$_2$ | $D_{34m}$ | —NH—(CH$_2$)$_2$—SO—(CH$_2$)$_2$—Cl |
| 28n | $D_{34n}$-NH$_2$ | $D_{34n}$ | —NH—(CH$_2$)$_2$—O—(CH$_2$)$_2$—SO$_2$—(CH$_2$)$_2$—Cl |
| 28o | $D_{34o}$-NH$_2$ | $D_{34o}$ | —NH—C$_6$H$_4$—SO$_2$—CH$_2$CH$_2$—OSO$_3$H (para) |
| 28p | $D_{34p}$-NH$_2$ | $D_{34p}$ | —NH—C$_6$H$_4$—SO$_2$—CH$_2$CH$_2$—OSO$_3$H (meta) |
| 28q | $D_{34q}$-NH$_2$ | $D_{34q}$ | —NH—C$_6$H$_4$—CONH(CH$_2$)$_2$SO$_2$(CH$_2$)$_2$—OSO$_3$H (meta) |

TABLE 1-continued
| Ex. | Amine $D_{xy}$-$NH_2$ | $D_{xy}$ | |
|---|---|---|---|
| 28r | $D_{34r}$-$NH_2$ | $D_{34r}$ | 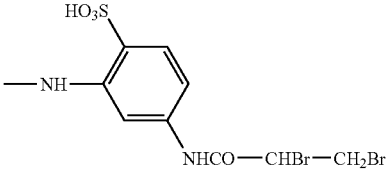 |
| 29 | $D_{35}$-$NH_2$ | $D_{35}$ = | 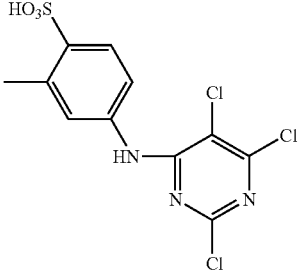 |
| 30 | $D_{36}$-$NH_2$ | $D_{38}$ = | 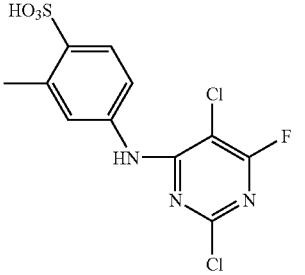 |
| 31 | $D_{37}$-$NH_2$ | $D_{37}$ = | 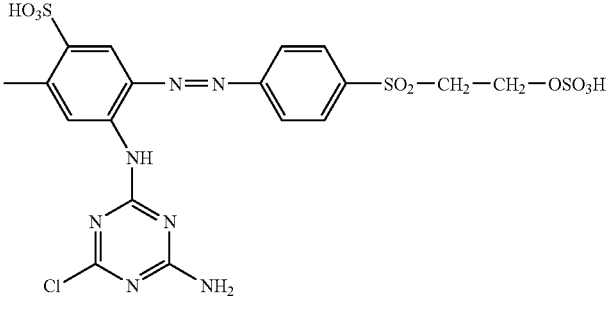 |
| 32 | $D_{38}$-$NH_2$ | $D_{38}$ = | 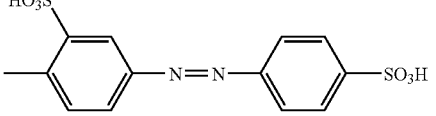 |
| 33 | $D_{39}$-$NH_2$ | $D_{39}$ = | 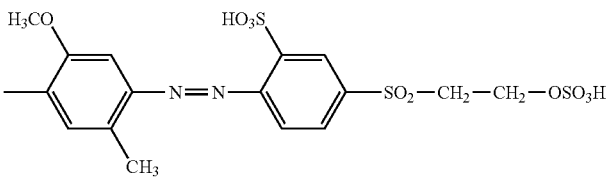 |

TABLE 1-continued

| Ex. | Amine $D_{xy}$-$NH_2$ | $D_{xy}$ | |
|---|---|---|---|
| 34 | $D_{40a}$-$NH_2$–$D_{40r}$-$NH_2$ | $D_{40a}$–$D_{40r}$ = | [structure: 4-sulfo-3-methylphenyl-NH-triazine with Cl and $T_3$ substituents] |
| | | $T_3$: | |
| 34a | $D_{40a}$-$NH_2$ | $D_{40a}$ | [structure: —NH–phenyl(NHCONH$_2$)–N=N–phenyl(SO$_3$H)–N=N–phenyl–SO$_3$H] |
| 34b | $D_{40b}$-$NH_2$ | $D_{40b}$ | [structure: —NH–phenyl(NHCONH$_2$)–N=N–naphthalene trisulfonic acid] |
| 34c | $D_{40c}$-$NH_2$ | $D_{40c}$ | [structure: —NH–phenyl(NHCOCH$_3$)–N=N–naphthalene(SO$_3$H)$_2$(HO$_3$S)] |
| 34d | $D_{40d}$-$NH_2$ | $D_{40d}$ | [structure: —NH–phenyl(NHCOCH$_3$)–N=N–naphthalene(SO$_3$H)(HO$_3$S)] |
| 34e | $D_{40e}$-$NH_2$ | $D_{40e}$ | [structure: —NH–phenyl(SO$_3$H)–N=N–pyridone with CH$_3$, CONH$_2$, OH, =O, N–CH$_2$CH$_3$] |

TABLE 1-continued

| Ex. | Amine $D_{xy}$-$NH_2$ | $D_{xy}$ |
|---|---|---|
| 34f | $D_{40f}$-$NH_2$ | $D_{40f}$: 4-methyl-3-(CH$_2$SO$_3$H)-6-oxo-1-ethyl-pyridine with 5-(arylazo), 2-OH; aryl = 4-SO$_3$H-3-(NH—)-phenyl |
| 35 | $D_{41a}$-$NH_2$–$D_{41u}$-$NH_2$ | $D_{41a}$–$D_{41u}$ = 4-sulfo-3-methylphenyl–NH–(4-Cl-triazin-2-yl)–NH–[5-position of 1-OH-3,6-disulfo-naphthalen-2-yl(N=N—D)] |
| 36 | $D_{42a}$-$NH_2$–$D_{42u}$-$NH_2$ | $D_{42a}$–$D_{42u}$ = 4-sulfo-3-methylphenyl–NH–(4-Cl-triazin-2-yl)–NH–[6-position of 1-OH-3-sulfo-naphthalen-2-yl(N=N—D)] |

D:

| Ex. | | |
|---|---|---|
| 35a/36a | $D_{41a/42a}$-$NH_2$ | $D_{41a/42a}$: 2-methyl-sulfophenyl |
| 35b/36b | $D_{41b/42b}$-$NH_2$ | $D_{41b/42b}$: 4-SO$_3$H-2-methyl-phenyl (HO$_3$S at 1, CH$_3$ at 3, SO$_3$H at 4) |
| 35c/36c | $D_{41c/42c}$-$NH_2$ | $D_{41c/42c}$: 2-SO$_3$H-4-OCH$_3$-methylphenyl |
| 35d/36d | $D_{41d/42d}$-$NH_2$ | $D_{41d/42d}$: 2-SO$_3$H-4-OCH$_3$-5-SO$_3$H-methylphenyl |

TABLE 1-continued

| Ex. | Amine $D_{xy}-NH_2$ | $D_{xy}$ | |
|---|---|---|---|
| 35e/36e | $D_{41e/42e}-NH_2$ | $D_{41e/42e}$ | 2,5-dimethylbenzene with HO₃S and CH₃ substituents |
| 35f/36f | $D_{41f/42f}-NH_2$ | $D_{41f/42f}$ | benzene with HO₃S, CH₃, SO₃H, and methyl substituents |
| 35g/36g | $D_{41g/42g}-NH_2$ | $D_{41g/42g}$ | 2-methylnaphthalene-1-sulfonic acid |
| 35h/36h | $D_{41h/42h}-NH_2$ | $D_{41h/42h}$ | 2-methylnaphthalene-1,5-disulfonic acid |
| 35i/36i | $D_{41i/42i}-NH_2$ | $D_{41i/42i}$ | 2-methylnaphthalene with SO₃H and SO₂—CH₂CH₂—OSO₃H |
| 35j/36j | $D_{41j/42j}-NH_2$ | $D_{41j/42j}$ | methylnaphthalene with SO₂—CH₂CH₂—OSO₃H |
| 35k/36k | $D_{41k/42k}-NH_2$ | $D_{41k/42k}$ | 2-methylnaphthalene with SO₃H and SO₂—CH₂CH₂—OSO₃H |
| 35l/36l | $D_{41l/42l}-NH_2$ | $D_{41l/42l}$ | methylnaphthalene with SO₂—CH₂CH₂—OSO₃H |
| 35m/36m | $D_{41m/42m}-NH_2$ | $D_{41m/42m}$ | methylnaphthalene with SO₂—CH₂CH₂—OSO₃H and SO₃H |

TABLE 1-continued

| Ex. | Amine $D_{xy}-NH_2$ | $D_{xy}$ | |
|---|---|---|---|
| 35n/36n | $D_{41n/42n}-NH_2$ | $D_{41n/42n}$ | ―⟨C₆H₄⟩―SO₂―CH₂CH₂―OSO₃H (para) |
| 35o/36o | $D_{41o/42o}-NH_2$ | $D_{41o/42o}$ | ―⟨C₆H₄⟩―SO₂―CH₂CH₂―OSO₃H (meta) |
| 35p/36p | $D_{41p/42p}-NH_2$ | $D_{41p/42p}$ | HO₃S-substituted phenyl―SO₂―CH₂CH₂―OSO₃H |
| 35q/36q | $D_{41q/42q}-NH_2$ | $D_{41q/42q}$ | H₃CO-substituted phenyl―SO₂―CH₂CH₂―OSO₃H |
| 35r/36r | $D_{41r/42r}-NH_2$ | $D_{41r/42r}$ | H₃CO, CH₃-substituted phenyl―SO₂―CH₂CH₂―OSO₃H |
| 35s/36s | $D_{41s/42s}-NH_2$ | $D_{41s/42s}$ | ―⟨C₆H₄⟩―CONH(CH₂)₂SO₂(CH₂)₂OSO₃H |
| 35t/36t | $D_{41t/42t}-NH_2$ | $D_{41t/42t}$ | HO₃S-substituted phenyl―NHCO―CHBr―CH₂Br |
| 35u/36u | $D_{41u/42u}-NH_2$ | $D_{41u/42u}$ | HO₃S-substituted phenyl―NHCO―CHBr―CH₂Br |

EXAMPLE 37

16 parts of the diamine of formula H₂N-D₄₃-NH₂ wherein D₄₃ corresponds to a radical of formula

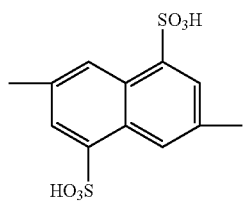

are dissolved in 160 parts of water at neutral pH. At 0° C., 13 parts of concentrated hydrochloric acid and then 19.5 parts of 4N sodium nitrite solution are slowly added. After reaction of the diamine to form the corresponding tetraazo compound has taken place, the excess nitrite is destroyed by adding sulfamic acid.

EXAMPLES 38 to 40

The tetraazo compounds of the diamines indicated in Table 2 can be prepared analogously to the procedure described in Example 37 by using, instead of the diamine of formula $H_2N-D_{43}-NH_2$ indicated in Example 37, an equimolar amount of a diamine of formula $H_2N-D_{xy}-NH_2$ indicated in Table 2.

EXAMPLE 41 a) 1st coupling: 123 parts of the compound according to Example 2b) are dissolved in 700 parts of water and, using a customary procedure, are diazotised at from 0 to 5° C. using sodium nitrite and HCl. Over the course of 30 minutes, the diazo suspension is added, at from 2 to 5° C., to a neutral solution of 39.5 parts of the compound of formula (101) according to Example 1 in 300 parts of water. The pH is maintained at from 4.5 to 5.5 using 20% sodium carbonate solution. After coupling is complete, the dye is precipitated using KCl and the resulting suspension is filtered. A brown dye, which has the following structure, is obtained.

TABLE 2

| Ex. | Diamine $H_2N-D_{xy}-NH_2$ | $D_{xy}$ |
|---|---|---|
| 38 | $H_2N-D_{44}-NH_2$ | $D_{44}$ = ![structure with two methylphenyl groups linked by $SO_2$] |
| 39 | $H_2N-D_{45}-NH_2$ | $D_{45}$ = ![structure with methylphenyl-$SO_2O$-phenyl-$C(CH_3)_2$-phenyl-$OSO_2$-methylphenyl] |
| 40 | $H_2N-D_{46}-NH_2$ | $D_{46}$ = ![methylphenyl-CONH-methylphenyl-$SO_3H$] |

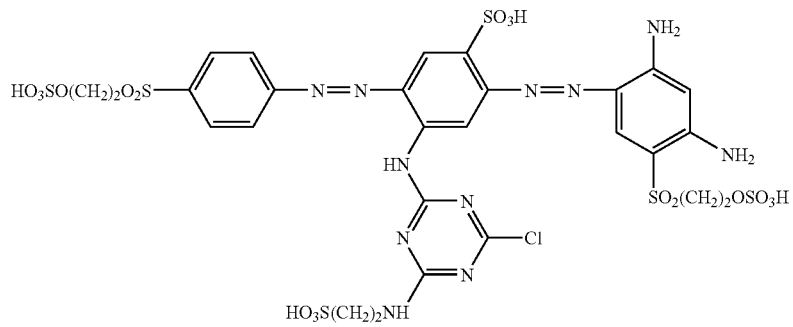

b) 2nd coupling: 118.5 parts of the dye according to a) are dissolved in 400 parts of water. Then, over the course of 15 minutes, 32.3 parts of the amine $D_{11}$-$NH_2$ diazotised according to Example 4 are added at from 0 to 10° C. The pH is maintained at from 5.5 to 7.0 using 20% sodium carbonate solution. After coupling is complete, precipitation with KCl and filtration are carried out. After drying, there is obtained the dye of formula (102)

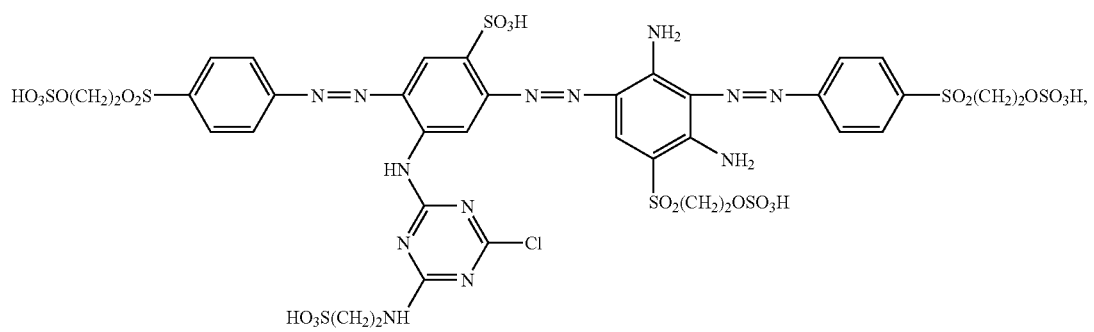

(102)

which dyes cotton and wool brown shades having good all-round fastness properties.

EXAMPLE 42

In analogous manner to that described in Example 41, there can be prepared the reactive dye of formula (103)

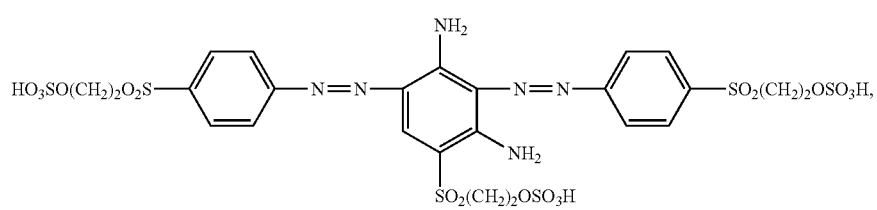

(103)

which dyes cotton a yellow shade having good all-round fastness properties.

EXAMPLES 43 TO 145

Analogously to the procedure described in Example 41, there can be prepared from the diazo compounds described in Examples 3 to 36 the dyes of the following general formula

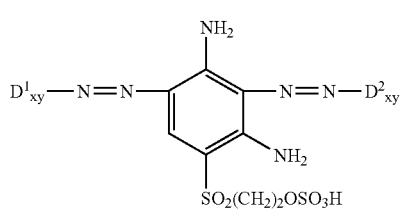

wherein $D^1_{xy}$ and $D^2_{xy}$ in each case correspond to the radicals indicated in Table 3 and those radicals have the meanings indicated in Examples 3 and 4 and in Table 1. The dyes dye cotton and wool the shades indicated in Table 3 having good all-round fastness properties.

TABLE 3

| Ex. | $D^1_{xy}$ 1st coupling | $D^2_{xy}$ 2nd coupling | Shade |
|---|---|---|---|
| 43 | $D_{10}$ | $D_{12}$ | yellow |
| 44 | $D_{13}$ | $D_{11}$ | gold-yellow |

TABLE 3-continued

| Ex. | $D^1_{xy}$ 1st coupling | $D^2_{xy}$ 2nd coupling | Shade |
|---|---|---|---|
| 45 | $D_{13}$ | $D_{12}$ | yellow |
| 46 | $D_{13}$ | $D_{13}$ | orange |
| 47 | $D_{19}$ | $D_{13}$ | yellow |
| 48 | $D_{18}$ | $D_{11}$ | orange |
| 49 | $D_{16}$ | $D_{13}$ | orange |
| 50 | $D_{15}$ | $D_{13}$ | yellow |
| 51 | $D_{14}$ | $D_{13}$ | orange |
| 52 | $D_{17}$ | $D_{13}$ | orange |
| 53 | $D_{14}$ | $D_{14}$ | orange |
| 54 | $D_{13}$ | $D_{20}$ | gold-yellow |
| 55 | $D_{13}$ | $D_{21}$ | gold-yellow |
| 56 | $D_{13}$ | $D_{22}$ | gold-yellow |
| 57 | $D_{23}$ | $D_{23}$ | orange |
| 58 | $D_{23}$ | $D_{11}$ | gold-yellow |
| 59 | $D_{23}$ | $D_{24}$ | orange |
| 60 | $D_{13}$ | $D_{25}$ | orange |
| 61 | $D_{13}$ | $D_{26}$ | gold-yellow |
| 62 | $D_{13}$ | $D_{27}$ | brown |
| 63 | $D_{11}$ | $D_{28}$ | brown |
| 64 | $D_{29}$ | $D_{13}$ | gold-yellow |
| 65 | $D_{13}$ | $D_{30}$ | orange |
| 66 | $D_{13}$ | $D_{31}$ | orange |
| 67 | $D_{32}$ | $D_{13}$ | yellow |
| 68 | $D_{33}$ | $D_{13}$ | yellow |

TABLE 3-continued

| Ex. | $D^1_{xy}$ 1st coupling | $D^2_{xy}$ 2nd coupling | Shade |
|---|---|---|---|
| 69 | $D_{34a}$ | $D_{11}$ | yellow |
| 70 | $D_{34b}$ | $D_{13}$ | orange |
| 71 | $D_{34c}$ | $D_{11}$ | yellow |
| 72 | $D_{34d}$ | $D_{11}$ | yellow |
| 73 | $D_{34e}$ | $D_{11}$ | yellow |
| 74 | $D_{34f}$ | $D_{11}$ | yellow |
| 75 | $D_{34g}$ | $D_{11}$ | yellow |
| 76 | $D_{34h}$ | $D_{11}$ | yellow |
| 77 | $D_{34i}$ | $D_{11}$ | yellow |
| 78 | $D_{34j}$ | $D_{11}$ | yellow |
| 79 | $D_{34k}$ | $D_{11}$ | yellow |
| 80 | $D_{34l}$ | $D_{11}$ | yellow |
| 81 | $D_{34m}$ | $D_{11}$ | yellow |
| 82 | $D_{34n}$ | $D_{11}$ | yellow |
| 83 | $D_{34o}$ | $D_{11}$ | yellow |
| 84 | $D_{34p}$ | $D_{11}$ | yellow |
| 85 | $D_{34q}$ | $D_{11}$ | yellow |
| 86 | $D_{34r}$ | $D_{11}$ | yellow |
| 87 | $D_{35}$ | $D_{11}$ | yellow |
| 88 | $D_{36}$ | $D_{11}$ | yellow |
| 89 | $D_{37}$ | $D_{38}$ | burgundy |
| 90 | $D_{39}$ | $D_{11}$ | brown |
| 91 | $D_{37}$ | $D_{17}$ | brown |
| 92 | $D_{37}$ | $D_{12}$ | brown |
| 93 | $D_{37}$ | $D_{19}$ | brown |
| 94 | $D_{37}$ | $D_{13}$ | brown |
| 95 | $D_{37}$ | $D_{23}$ | brown |
| 96 | $D_{37}$ | $D_{11}$ | brown |
| 97 | $D_{40a}$ | $D_{11}$ | brown-orange |
| 98 | $D_{40b}$ | $D_{11}$ | gold-orange |
| 99 | $D_{40c}$ | $D_{11}$ | gold-orange |
| 100 | $D_{40d}$ | $D_{11}$ | gold-orange |
| 101 | $D_{40e}$ | $D_{11}$ | gold-yellow |
| 102 | $D_{40f}$ | $D_{11}$ | gold-yellow |
| 103 | $D_{41a}$ | $D_{11}$ | red |
| 104 | $D_{41b}$ | $D_{11}$ | red |
| 105 | $D_{41c}$ | $D_{11}$ | red |
| 106 | $D_{41d}$ | $D_{11}$ | red |
| 107 | $D_{41e}$ | $D_{11}$ | red |
| 108 | $D_{41f}$ | $D_{11}$ | red |
| 109 | $D_{41g}$ | $D_{11}$ | red |
| 110 | $D_{41h}$ | $D_{11}$ | red |
| 111 | $D_{41i}$ | $D_{11}$ | red |
| 112 | $D_{41j}$ | $D_{11}$ | red |
| 113 | $D_{41k}$ | $D_{11}$ | red |
| 114 | $D_{41l}$ | $D_{11}$ | red |
| 115 | $D_{41m}$ | $D_{11}$ | red |
| 116 | $D_{41n}$ | $D_{11}$ | red |
| 117 | $D_{41o}$ | $D_{11}$ | red |
| 118 | $D_{41p}$ | $D_{11}$ | red |
| 119 | $D_{41q}$ | $D_{11}$ | red |
| 120 | $D_{41r}$ | $D_{11}$ | red |
| 121 | $D_{41s}$ | $D_{11}$ | red |
| 122 | $D_{41t}$ | $D_{11}$ | red |
| 123 | $D_{41u}$ | $D_{11}$ | red |
| 124 | $D_{42a}$ | $D_{11}$ | orange |
| 125 | $D_{42b}$ | $D_{11}$ | orange |
| 126 | $D_{42c}$ | $D_{11}$ | orange |
| 127 | $D_{42d}$ | $D_{11}$ | orange |
| 128 | $D_{42e}$ | $D_{11}$ | orange |
| 129 | $D_{42f}$ | $D_{11}$ | orange |
| 130 | $D_{42g}$ | $D_{11}$ | orange |
| 131 | $D_{42h}$ | $D_{11}$ | orange |
| 132 | $D_{42i}$ | $D_{11}$ | orange |
| 133 | $D_{42j}$ | $D_{11}$ | orange |
| 134 | $D_{42k}$ | $D_{11}$ | orange |
| 135 | $D_{42l}$ | $D_{11}$ | orange |
| 136 | $D_{42m}$ | $D_{11}$ | orange |
| 137 | $D_{42n}$ | $D_{11}$ | orange |
| 138 | $D_{42o}$ | $D_{11}$ | orange |
| 139 | $D_{42p}$ | $D_{11}$ | orange |
| 140 | $D_{42q}$ | $D_{11}$ | orange |
| 141 | $D_{42r}$ | $D_{11}$ | orange |
| 142 | $D_{42s}$ | $D_{11}$ | orange |
| 143 | $D_{42t}$ | $D_{11}$ | orange |
| 144 | $D_{42u}$ | $D_{11}$ | orange |
| 145 | $D_{18a}$ | $D_{13}$ | orange |

EXAMPLE 146 a) 1st coupling: Over the course of 30 minutes, the acid suspension of the tetraazo compound obtained according to Example 37 is added, at from 2 to 5° C., to a neutral solution of 32.9 parts of the compound of formula (101) according to Example 1 in 300 parts of water. The pH is maintained at from 4.5 to 5.5 using 20% sodium carbonate solution. After coupling is complete, there is obtained the following compound

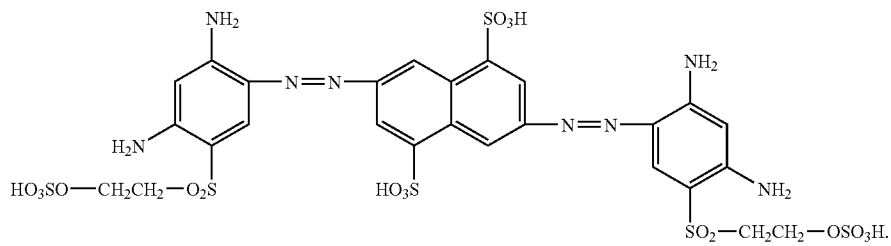

b) 2nd coupling: Over the course of 15 minutes, 31.3 parts of the amine $D_{11}$-$NH_2$ diazotised according to Example 4 are added to the suspension obtained according to a). The pH is maintained at from 5.5 to 7.0 using 20% sodium carbonate solution. After coupling is complete, precipitation using KCl and filtration are carried out. After drying, there is obtained the dye of formula (104)

As an alternative to that procedure, dyeing can be carried out at 80° C. instead of at 60° C.

Dyeing Procedure II 0.1 part of the dye according to Example 41 is dissolved in 200 parts of water, and 0.5 part of sodium sulfate, 0.1 part

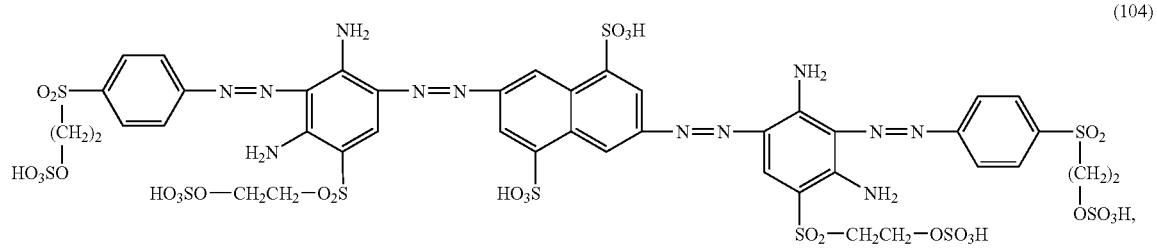

(104)

which dyes cotton and wool brown-orange shades having good all-round fastness properties.

EXAMPLES 147 TO 150

Analogously to the procedure described in Example 146, there can be prepared from the tetraazo compounds described in Table 2 and the diazo compound described in Example 6, the dyes of the following general formula of a levelling agent (based on the condensation product of a higher aliphatic amine and ethylene oxide) and 0.5 part of sodium acetate are added. The pH is then adjusted to a value of 5.5 with acetic acid (80%). The dyebath is heated at 50° C. for 10 minutes and then 10 parts of a woollen fabric are added. The dyebath is heated to a temperature of 100° C. in the course of about 50 minutes and dyeing is carried out at that temperature for 60 minutes. The dyebath is then cooled

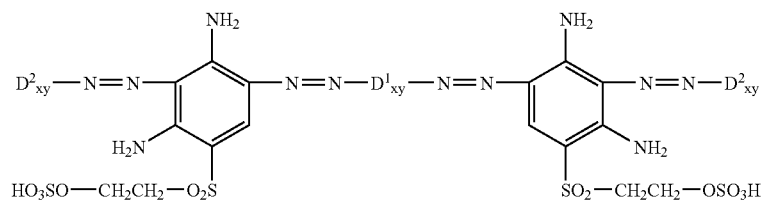

wherein $D^1_{xy}$ and $D^2_{xy}$ in each case correspond to the radicals indicated in Table 4 and those radicals have the meanings indicated in Table 2 and in Example 6. The dyes dye cotton and wool the shades indicated in Table 4 having good all-round fastness properties.

to 90° C. and the dyed goods are removed. The woollen fabric is washed with hot and cold water, then spun and dried.

Printing Procedure

TABLE 4

| Ex. | $D^1_{xy}$ 1st coupling | $D^2_{xy}$ 2nd coupling | Shade |
|---|---|---|---|
| 147 | $D_{44}$ | $D_{13}$ | brown-orange |
| 148 | $D_{45}$ | $D_{13}$ | brown-orange |
| 149 | $D_{46}$ | $D_{13}$ | brown-orange |
| 150 | $D_{46}$ | $D_{13}$ | brown-orange |

Dyeing Procedure I 100 parts of cotton fabric are placed at 60° C. in 1500 parts of a dyebath containing 45 g/l of sodium chloride and 2 parts of the reactive dye obtained according to Example 41. After 45 minutes at 60° C., 20 g/l of calcined soda are added. Dyeing is continued at that temperature for a further 45 minutes. The dyed goods are then rinsed, soaped at the boil for a quarter of an hour with a non-ionic detergent, rinsed again and dried.

While stirring rapidly, 3 parts of the dye obtained according to Example 41 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, if desired soaped at the boil and again rinsed, and then dried.

What is claimed is:

1. A reactive dye containing at least one structural unit of formula (1)

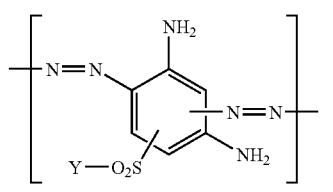

wherein
Y is vinyl or a radical —CH$_2$—CH$_2$—U and U is a group removable under alkaline conditions.

2. A reactive dye according to claim 1, corresponding to formula (1aa)

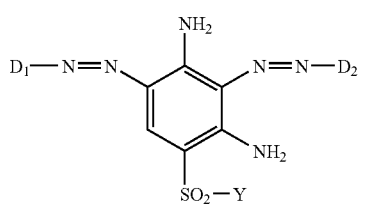

or (1ab)

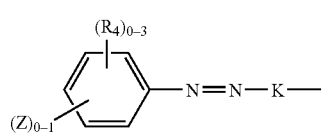

wherein
D$_1$ and D$_2$ are each independently of the other the radical of a diazo component, of the benzene or naphthalene series,
D$_3$ is the radical of an aromatic tetraazo component, and
Y is as defined in claim 1.

3. A reactive dye according to claim 1, wherein Y is vinyl, β-chloroethyl or β-sulfatoethyl.

4. A reactive dye according to claim 2, which corresponds to formula (1aa).

5. A reactive dye according to claim 2, wherein D$_1$ and D$_2$ correspond, each independently of the other, to a radical of formula (11) or (12)

(11)

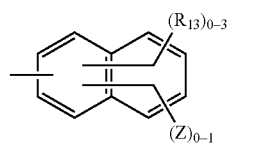

or (12)

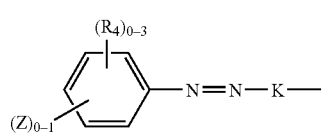

wherein
(R$_4$)$_{0-3}$ and (R$_{13}$)$_{0-3}$ each independently of the other denote from 0 to 3 identical or different substituents selected from the group halogen, C$_1$–C$_4$alkyl, C$_1$–C$_4$alkoxy, carboxy and sulfo, K is the radical of a coupling component of formula (13a) or (13b)

(13a)

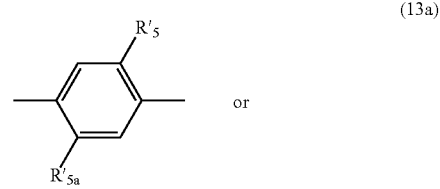

or (13b)

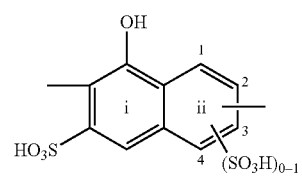

and
Z and Z$_1$ are each independently of the other a radical of formula (2a), (2c), (2d), (2e) or (2f)

—SO$_2$—Y (2a),

—CONR$_2$—(CH$_2$)$_m$—SO$_2$—Y (2c),

—NH—CO—CH(Hal)-CH$_2$-Hal (2d),

—NH—CO—C(Hal)=CH$_2$ (2e) or (2f)

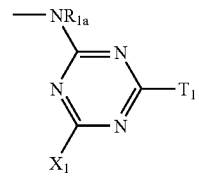

wherein
R$_{1a}$ and R$_2$ are hydrogen,
Hal is bromine,
Y is vinyl, β-chloroethyl or β-sulfatoethyl,
T$_1$ is C$_1$–C$_4$alkoxy, C$_1$–C$_4$alkylthio, hydroxy, amino, N-mono- or N,N-di-C$_1$–C$_4$alkylamino unsubsituted or substituted in the alkyl moiety by hydroxy, sulfato or by sulfo, morpholino, or phenylamino or NC$_1$–C$_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula (3c') or (3d')

(3c')

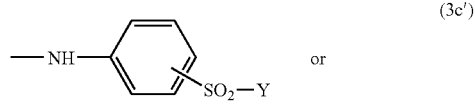

or

-continued (3d')

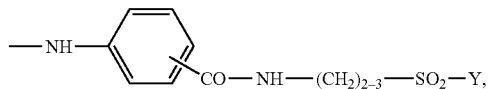

and Y is as defined above,
$X_1$ is chlorine or fluorine,
m is a number 2 or 3,
$R'_5$ is hydrogen, sulfo, or $C_1$–$C_4$alkoxy, unsubstituted or substituted in the alkyl moiety by hydroxy or by sulfato,
$R'_{5a}$ is hydrogen, $C_1$–$C_4$alkyl, $C_1$–$C_4$alkoxy, $C_2$–$C_4$alkanoylamino, ureido or a radical of formula (2f) wherein the radicals $R_{1a}$, $T_1$ and $X_1$ are as defined above.

6. A reactive dye according to claim 5, wherein
the radicals $D_1$ and $D_2$ correspond, each independently of the other, to a radical of formula (11a), (11b), (11c), (11d) or (12a)

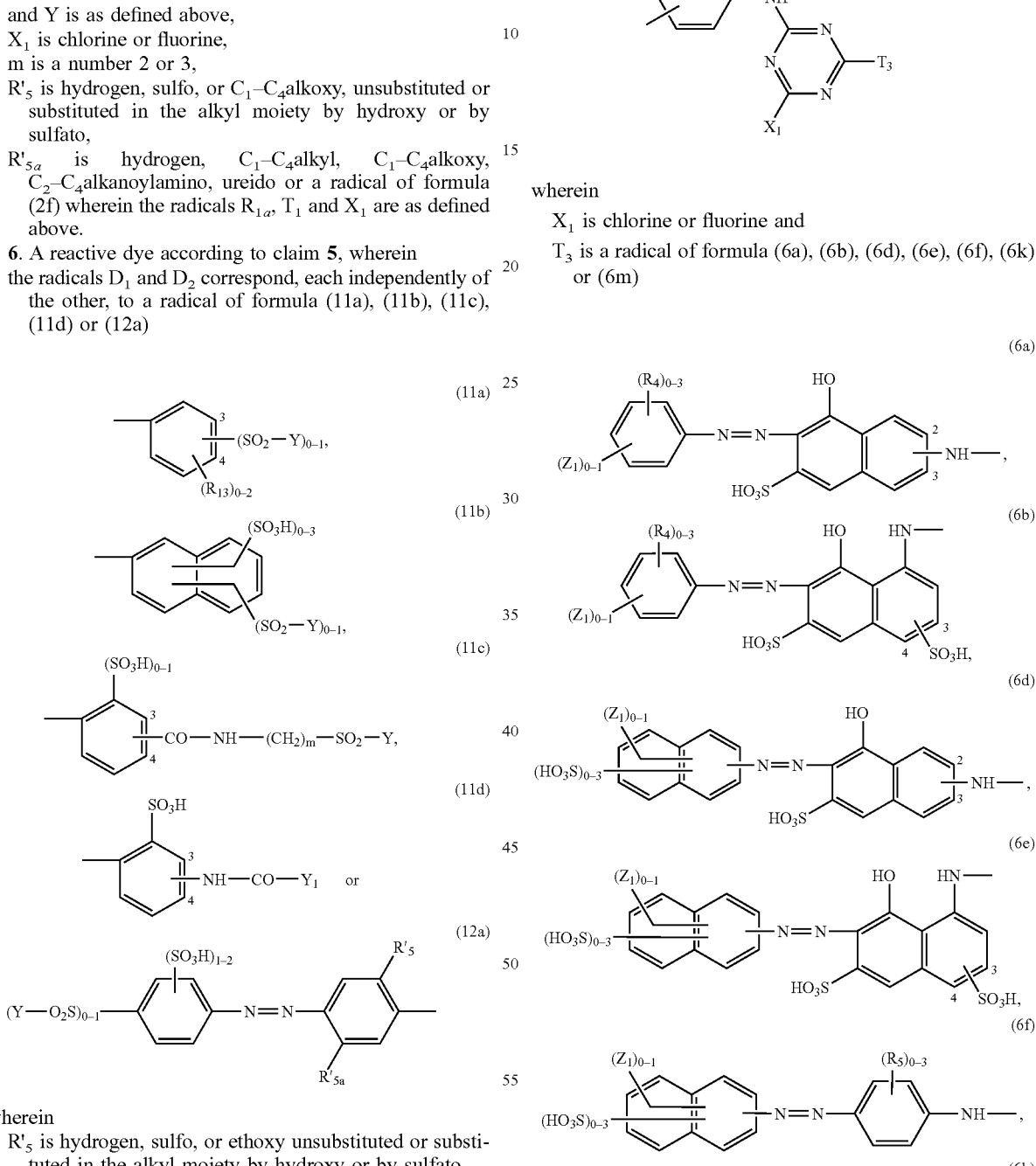

wherein
$R'_5$ is hydrogen, sulfo, or ethoxy unsubstituted or substituted in the alkyl moiety by hydroxy or by sulfato,
$R'_{5a}$ is hydrogen, methyl, ethyl, methoxy, ethoxy, acetylamino, propionylamino or ureido,
$(R_{13})_{0-2}$ denotes from 0 to 2 identical or different substituents selected from the group halogen, $C_1$–$C_4$alkyl, $C_1$–$C_4$alkoxy and sulfo,
$Y_1$ is a group —CH(Br)—CH$_2$—Br or —C(Br)=CH$_2$,
Y is vinyl, β-chloroethyl or β-sulfatoethyl, and
m is a number 2 or 3.

7. A reactive dye according to claim 2, wherein one of the radicals $D_1$ and $D_2$ corresponds to a radical of formula (14)

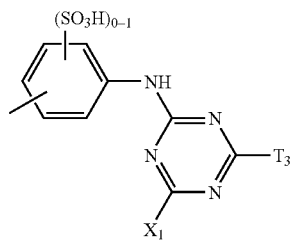

wherein
$X_1$ is chlorine or fluorine and
$T_3$ is a radical of formula (6a), (6b), (6d), (6e), (6f), (6k) or (6m)

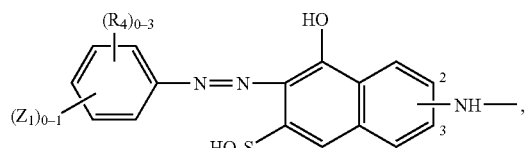

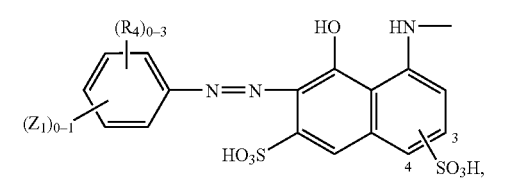

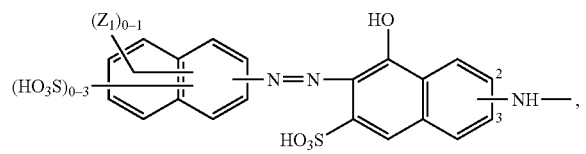

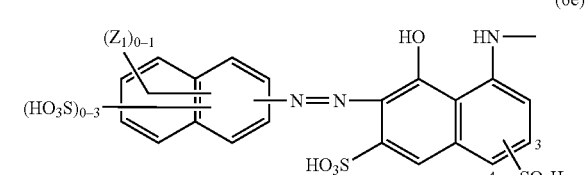

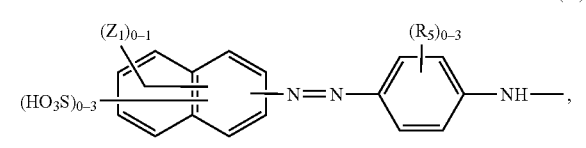

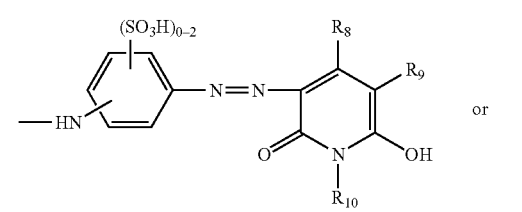

-continued

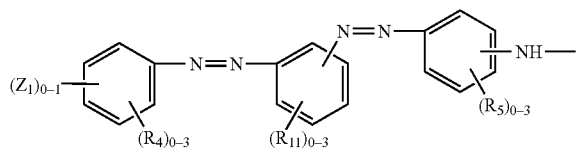
(6m)

wherein $(R_4)_{0-3}$ denotes from 0 to 3 identical or different substituents selected from the group $C_1$–$C_4$alkyl, $C_1$–$C_4$alkoxy, halogen, carboxy and sulfo, $(R_5)_{0-3}$ denotes from 0 to 3 identical or different substituents selected from the group halogen, nitro, cyano, trifluoromethyl, sulfamoyl, carbamoyl, $C_1$–$C_4$alkyl, $C_1$–$C_4$alkoxy unsubstituted or substituted by hydroxy, sulfato or by $C_1$–$C_4$alkoxy, amino, $C_2$–$C_4$alkanoylamino, ureido, hydroxy, carboxy, sulfomethyl, $C_1$–$C_4$alkylsulfonylamino and sulfo, $R_8$ and $R_{10}$ are each independently of the other hydrogen, $C_1$–$C_4$alkyl or phenyl, and $R_9$ is hydrogen, cyano, carbamoyl or sulfomethyl, $(R_{11})_{0-3}$ denotes from 0 to 3 identical or different substituents selected from the group $C_1$–$C_4$alkyl $C_1$–$C_4$alkoxy, halogen, carboxy and sulfo, and $Z_1$ is a radical of formula (2a), (2c'), (2d') or (2e')

—SO$_2$—Y (2a),

—CONH—(CH$_2$)$_{2-3}$—SO$_2$—Y (2c'),

—NH—CO—CH(Br)—CH$_2$—Br (2d') or

—NH—CO—C(Br)=CH$_2$ (2e')

wherein Y is vinyl, β-chloroethyl or β-sulfatoethyl;

and the other of the radicals $D_1$ and $D_2$ corresponds to a radical of formula (11a), (11b), (11c) or (11d)

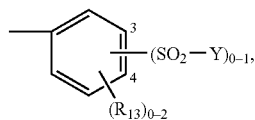
(11a)

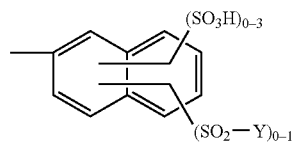
(11b)

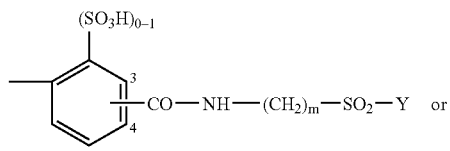
(11c)

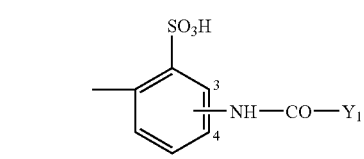
(11d)

wherein $(R_{13})_{0-2}$ denotes from 0 to 2 identical or different substituents selected from the group halogen, $C_1$–$C_4$alkyl, $C_1$–$C_4$alkoxy and sulfo, $Y_1$ is a group —CH(Br)—CH$_2$—Br or —C(Br)=CH$_2$, Y is as defined above, and m is a number 2 or 3.

8. A reactive dye according to claim 2, which corresponds to formula (1aa)

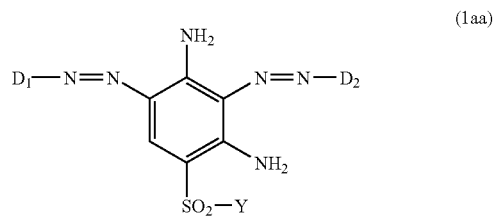
(1aa)

wherein

Y is vinyl, β-chloroethyl or β-sulfatoethyl, $D_1$ and $D_2$ are each independently of the other a radical of formula (11) or (12)

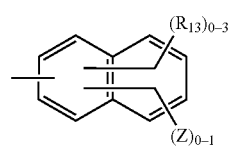
(11)

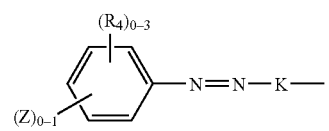
(12)

wherein $(R_4)_{0-3}$ and $(R_{13})_{0-3}$ each independently of the other denote from 0 to 3 identical or different substituents selected from the group halogen, $C_1$–$C_4$alkyl, $C_1$–$C_4$alkoxy, carboxy and sulfo, K is the radical of a coupling component of formula (13a) or (13b)

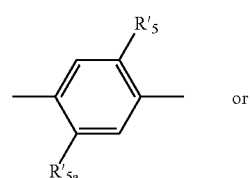
(13a)

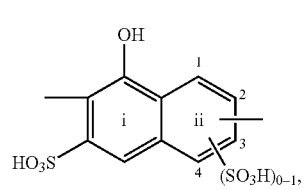
(13b)

and

Z and $Z_1$ are each independently of the other a radical of formula (2a), (2c), (2d), (2e) or (2f)

—SO₂—Y    (2a),

—CONR₂—(CH₂)ₘ—SO₂—Y    (2c),

—NH—CO—CH(Hal)-CH₂-Hal    (2d),

—NH—CO—C(Hal)=CH₂    (2e) or

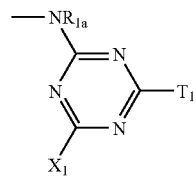  (2f)

wherein
$R_{1a}$ and $R_2$ are hydrogen,
Hal is bromine,
Y is as defined above,
$T_1$ is $C_1$–$C_4$alkoxy, $C_1$–$C_4$alkylthio, hydroxy, amino, N-mono- or N, N-di-$C_1$–$C_4$alkylamino unsubsituted or substituted in the alkyl moiety by hydroxy, sulfato or by sulfo, morpholino, or phenylamino or N—$C_1$–$C_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula (3c') or (3d')

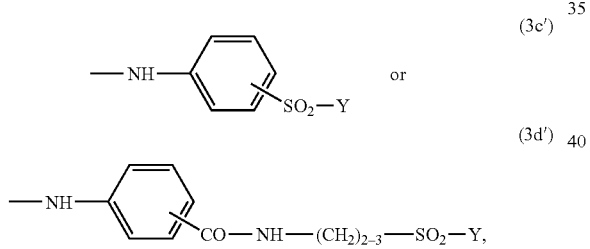

and Y is as defined above,
$X_1$ is chlorine or fluorine,
m is a number 2 or 3,
$R'_5$ is hydrogen, sulfo, or $C_1$–$C_4$alkoxy unsubstituted or substituted in the alkyl moiety by hydroxy or by sulfato, $R'_{5a}$ is hydrogen, $C_1$–$C_4$alkyl, $C_1$–$C_4$alkoxy, $C_2$–$C_4$alkanoylamino, ureido or a radical of formula (2f) wherein the radicals $R_{1a}$, $T_1$ and $X_1$ are as defined above.

9. A process for the preparation of a reactive dye according to claim 1, which comprises coupling one or more than one diazotised amine, together or in any order, to a compound containing at least one structural unit of formula (15)

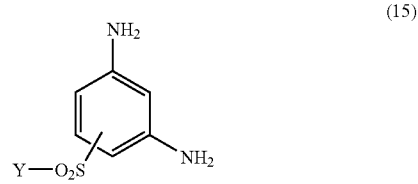  (15)

so that a reactive dye containing at least one structural unit of formula (1) is obtained.

10. A method of dyeing or printing of hydroxyl-group-containing or nitrogen-containing fibre materials, which comprises contacting said materials with a tinctorially effective amount of a reactive dye according to claim 1.

11. A method according to claim 10, wherein cellulosic fibre materials are dyed or printed.

12. A reactive dye of formula (15b)

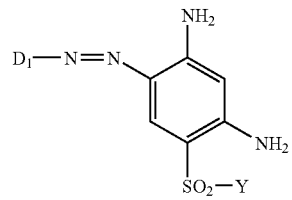  (15b)

wherein
$D_1$ is the radical of a diazo component, of the benzene or naphthalene series, and
Y is vinyl or a radical —CH₂—CH₂—U and U is a group removable under alkaline conditions.

13. A method according to claim 10, wherein cotton-containing fibre materials are dyed or printed.

* * * * *